Figure 34:
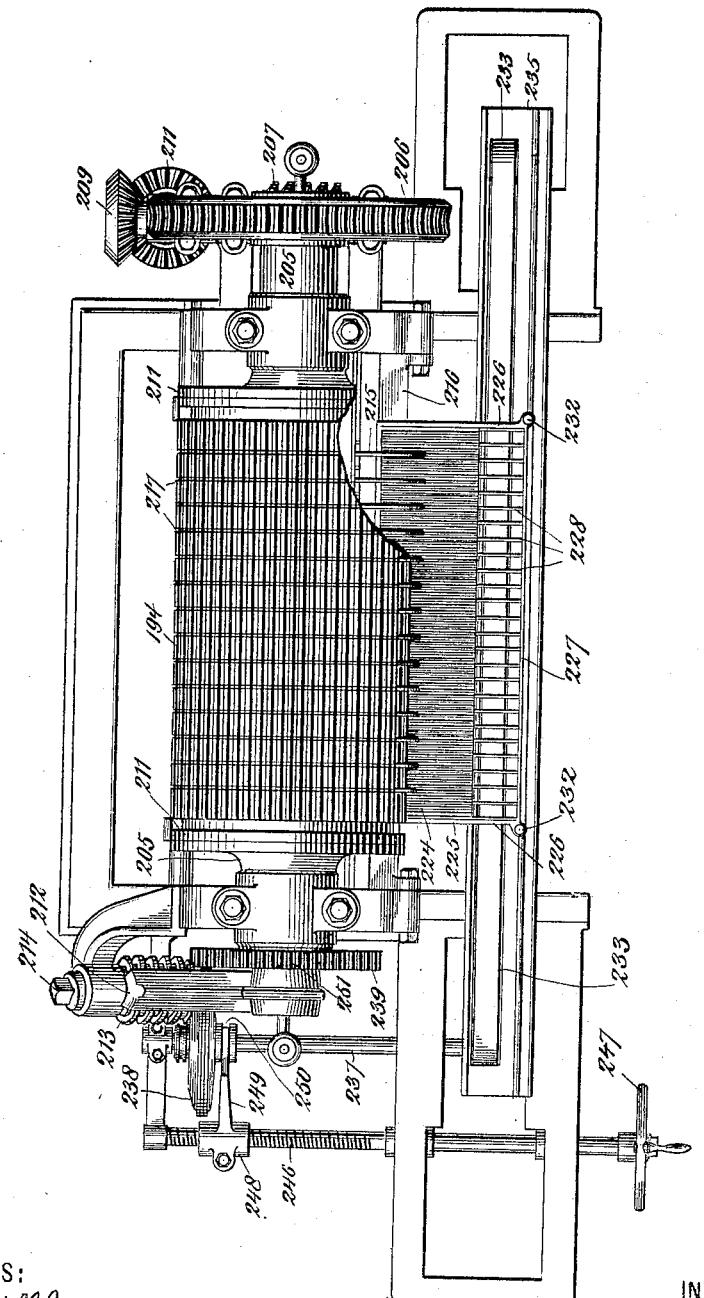

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 1.
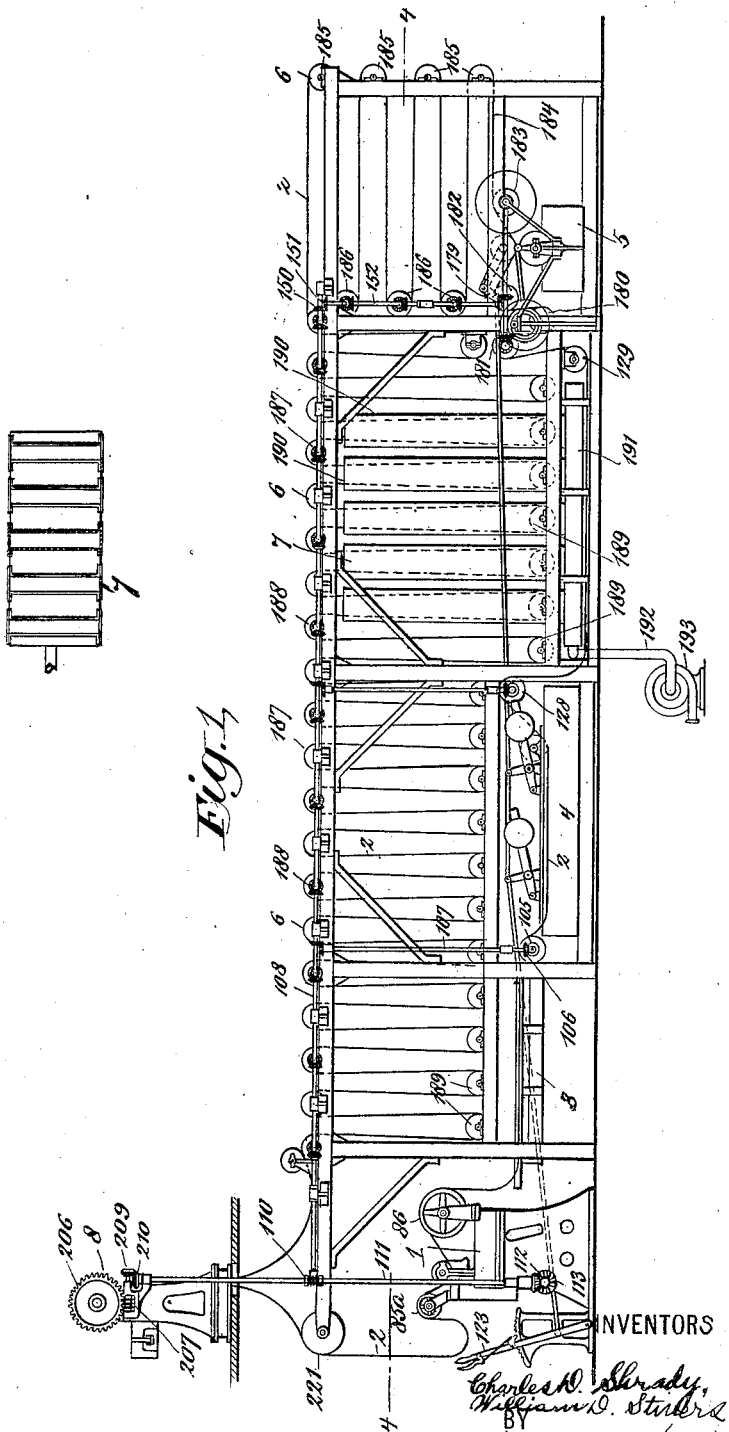
WITNESSES:
INVENTORS
Charles D. Shrady,
William D. Stivers,
BY
Kenyon & Kenyon,
ATTORNEYS.

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 2.
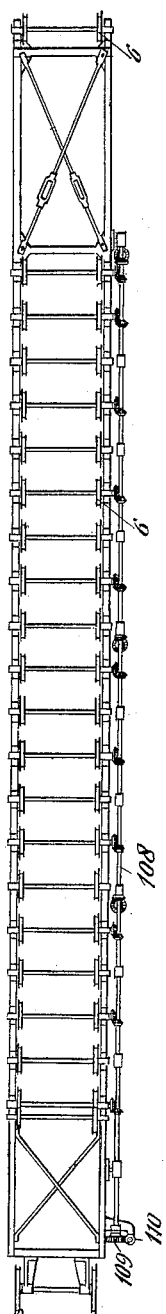
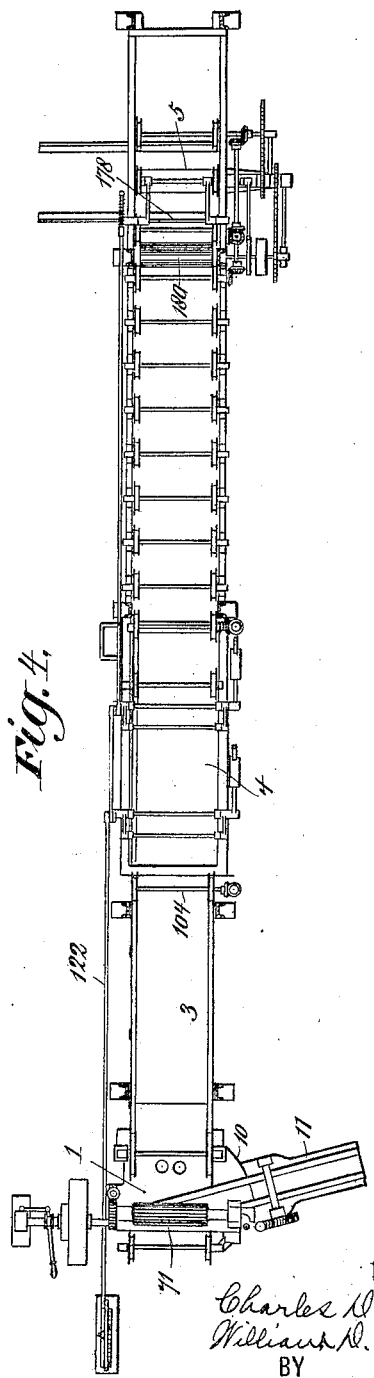
WITNESSES:
INVENTORS
Charles D. Shrady
William D. Stivers
BY
Kenyon & Kenyon
ATTORNEYS.

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 3.
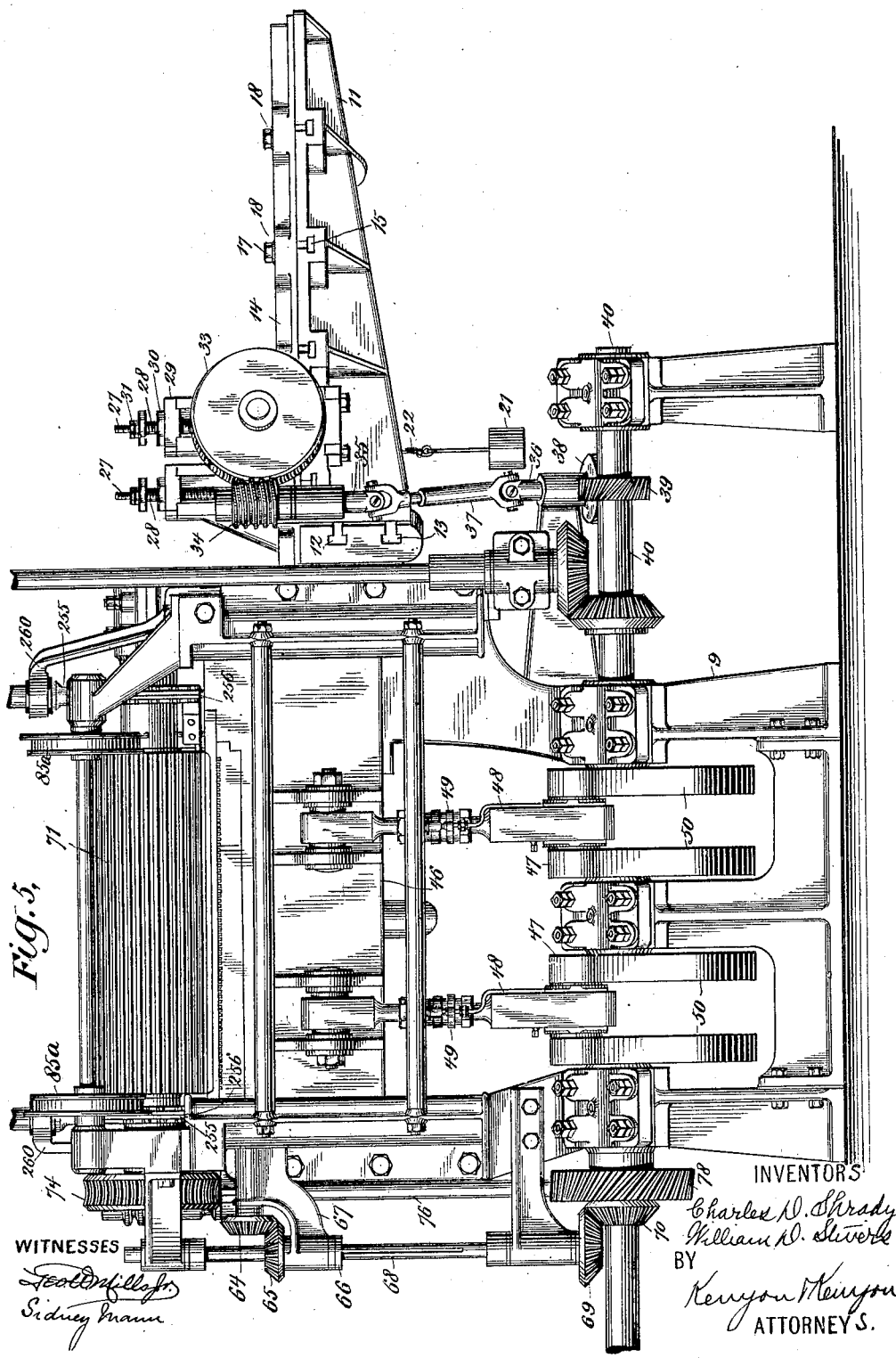

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 4.
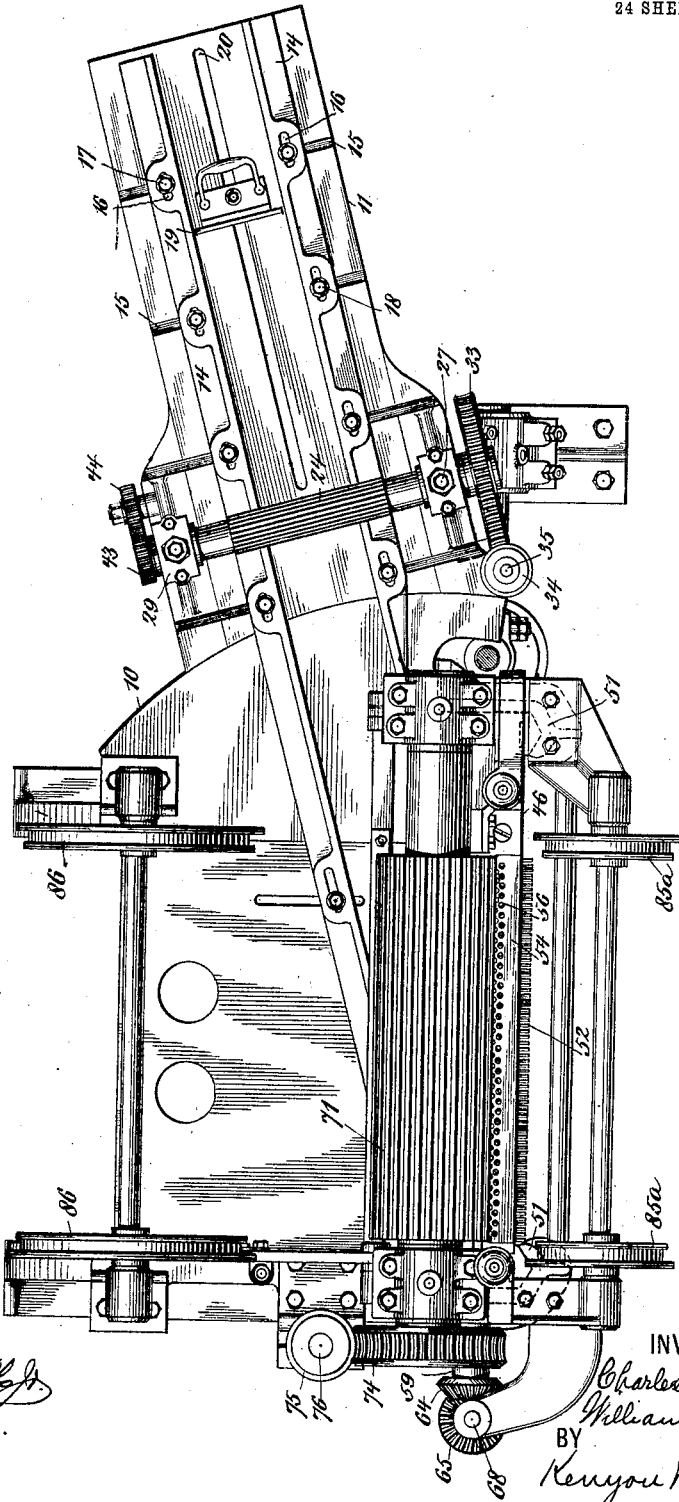
WITNESSES:
INVENTORS
Charles D. Shrady
William D. Stivers
BY
Kenyon & Kenyon
ATTORNEYS.

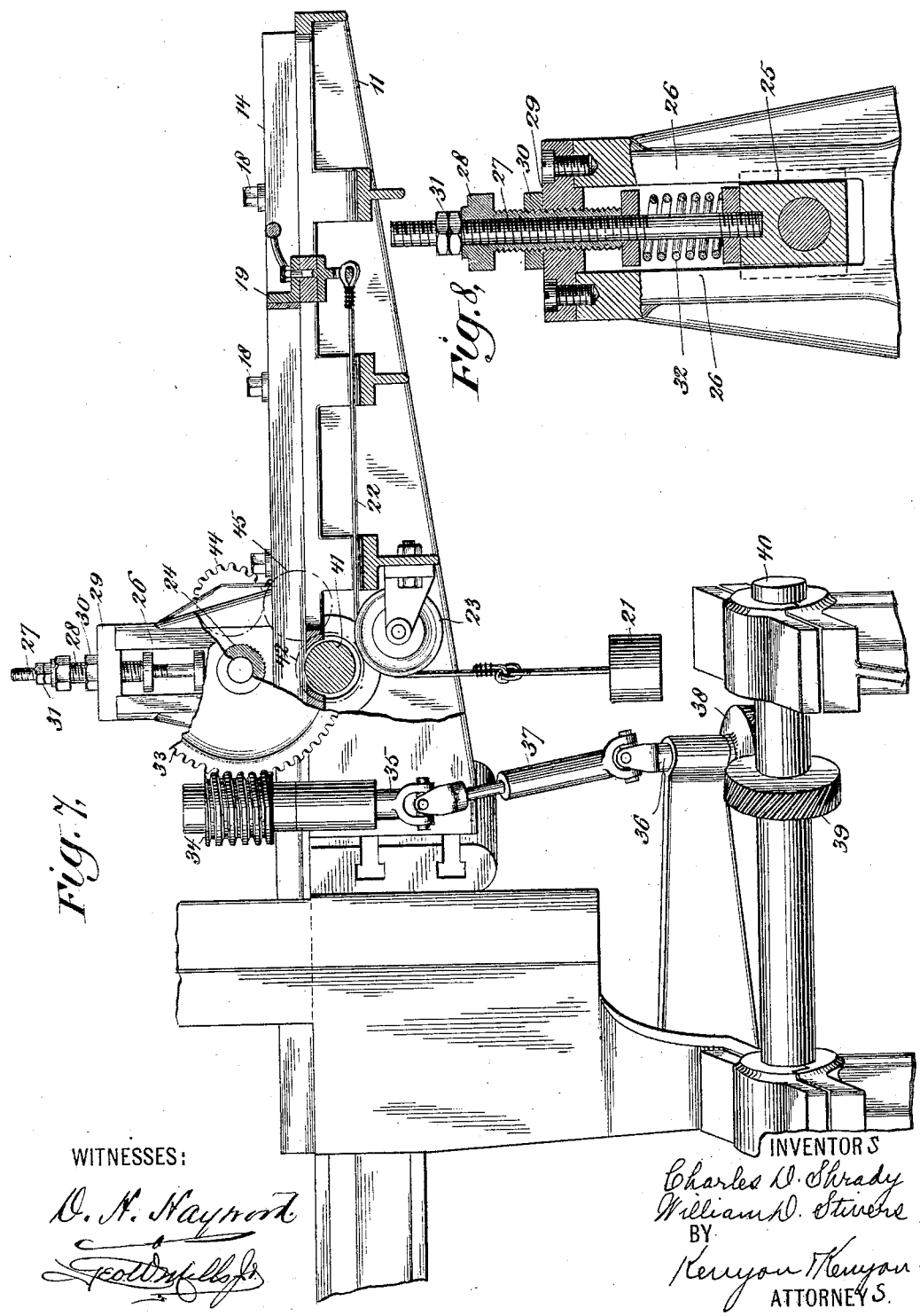

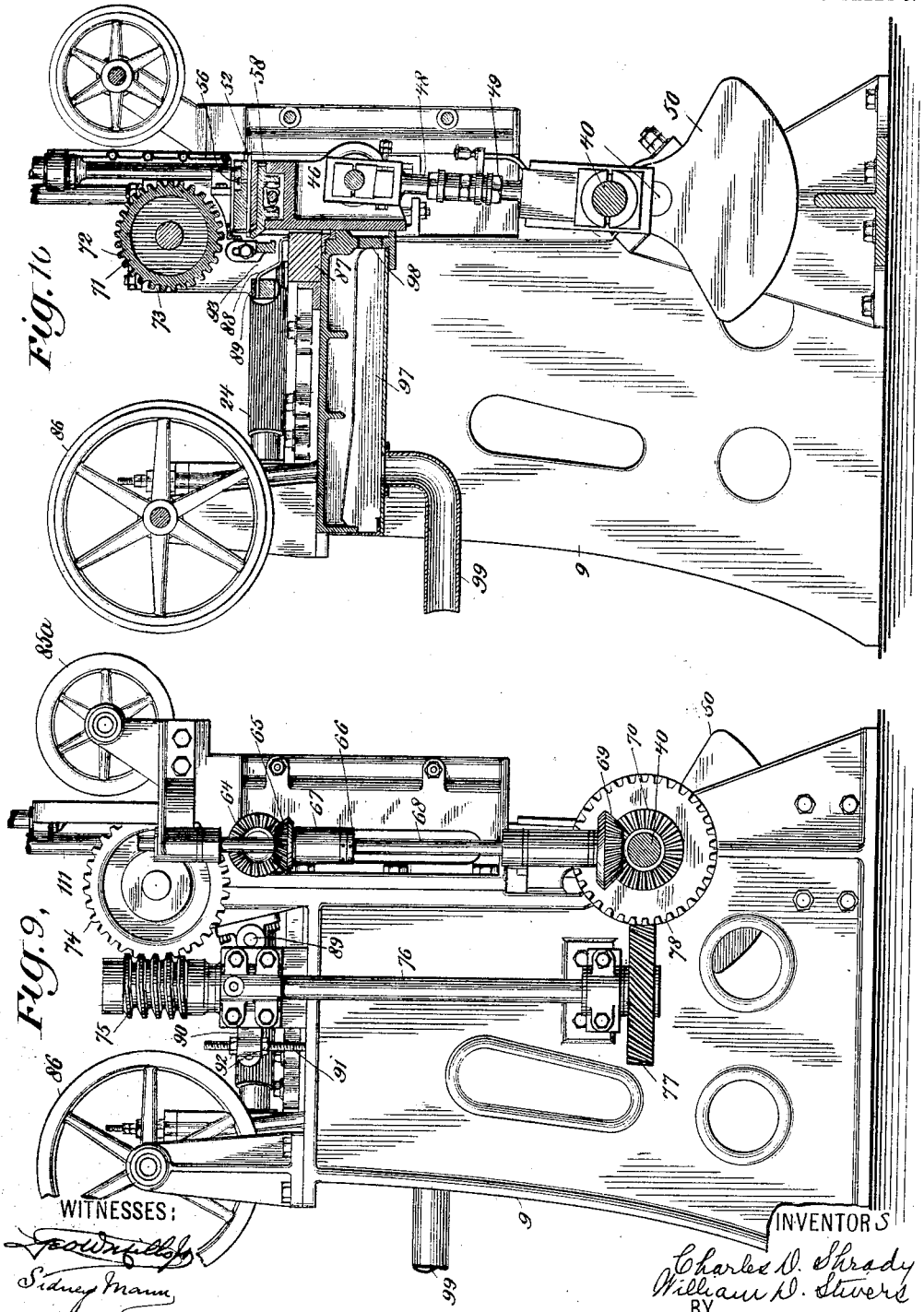

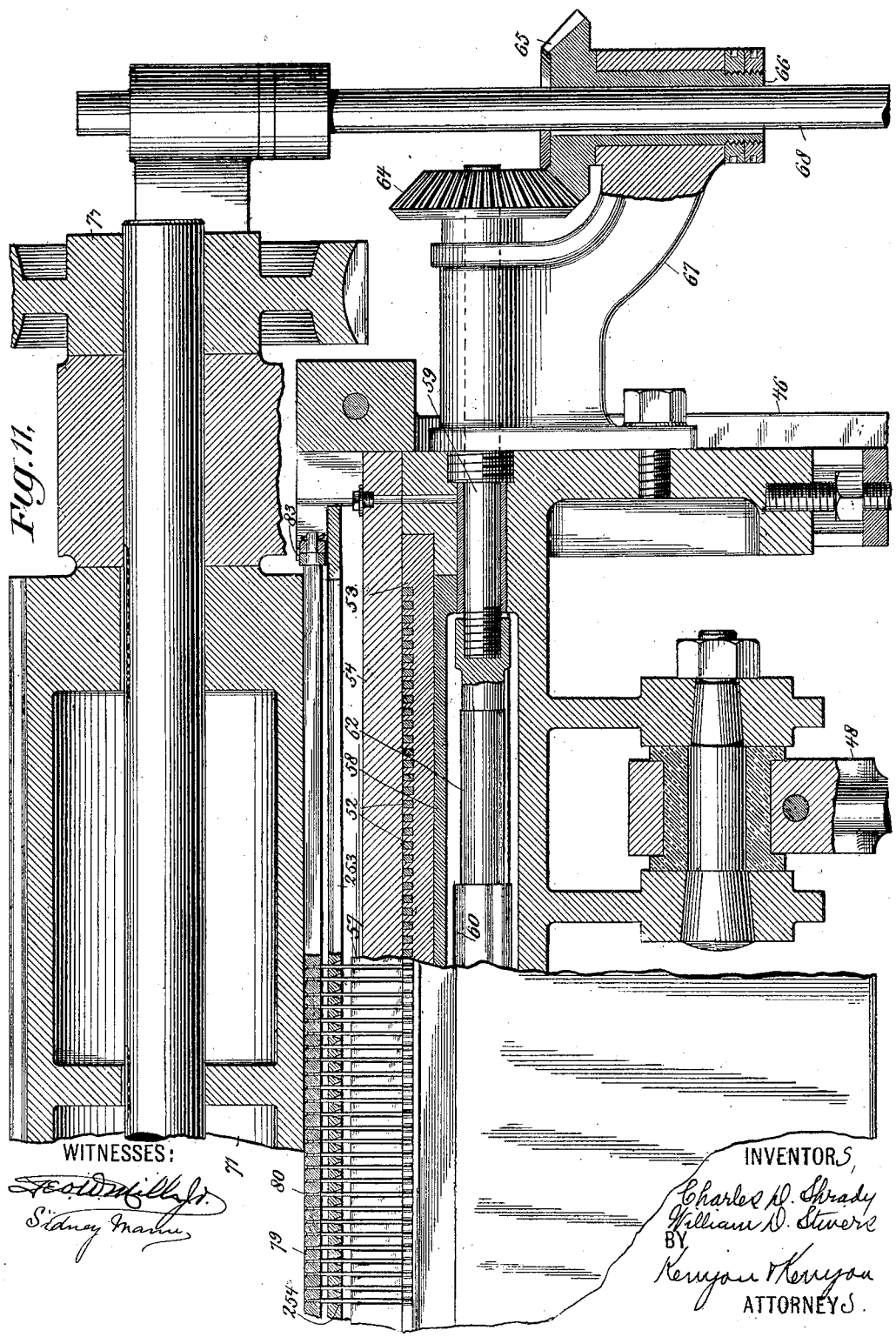

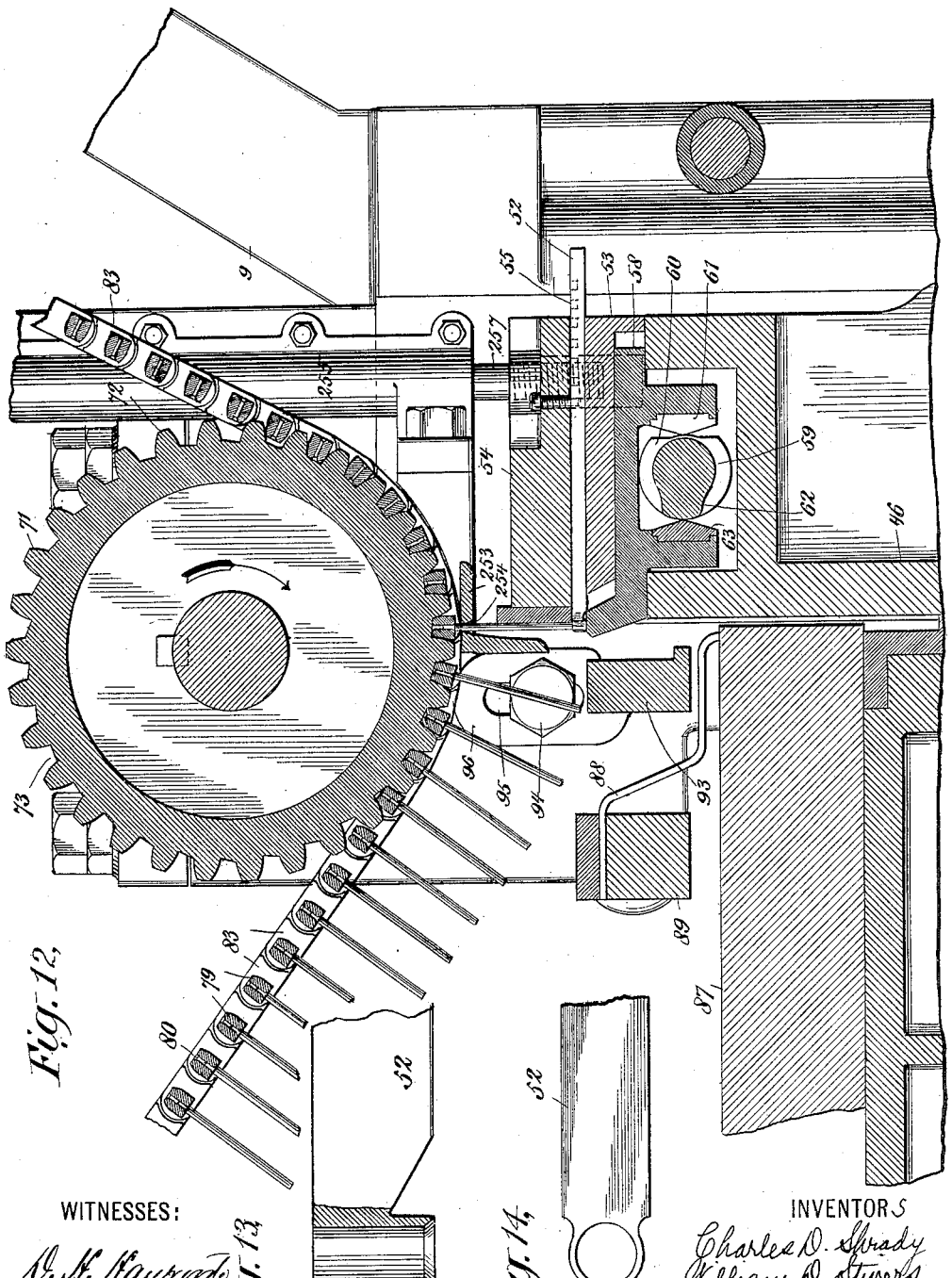

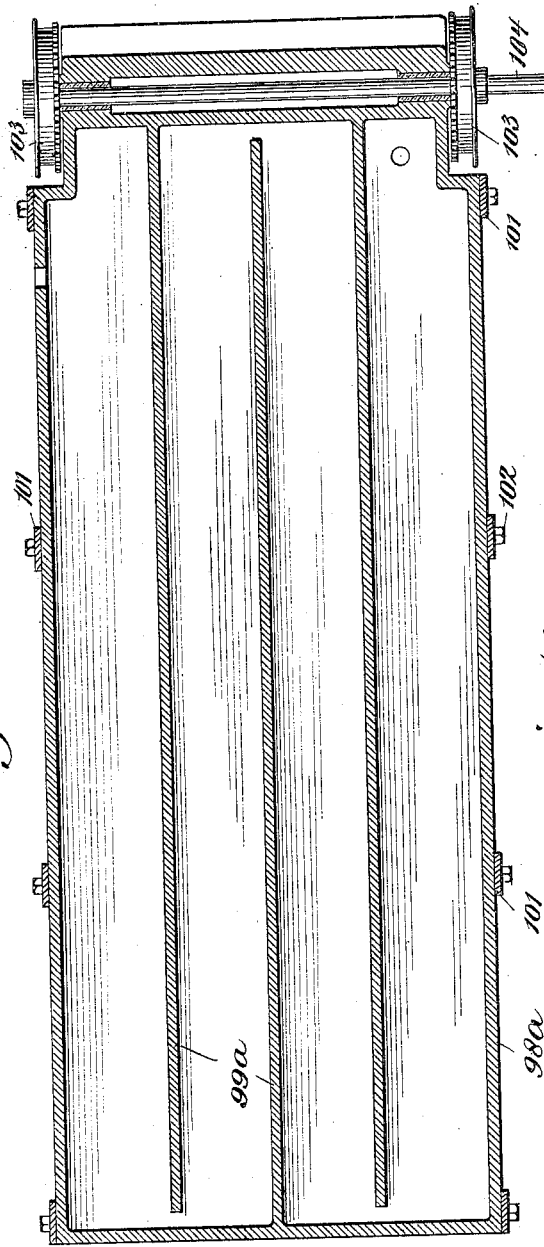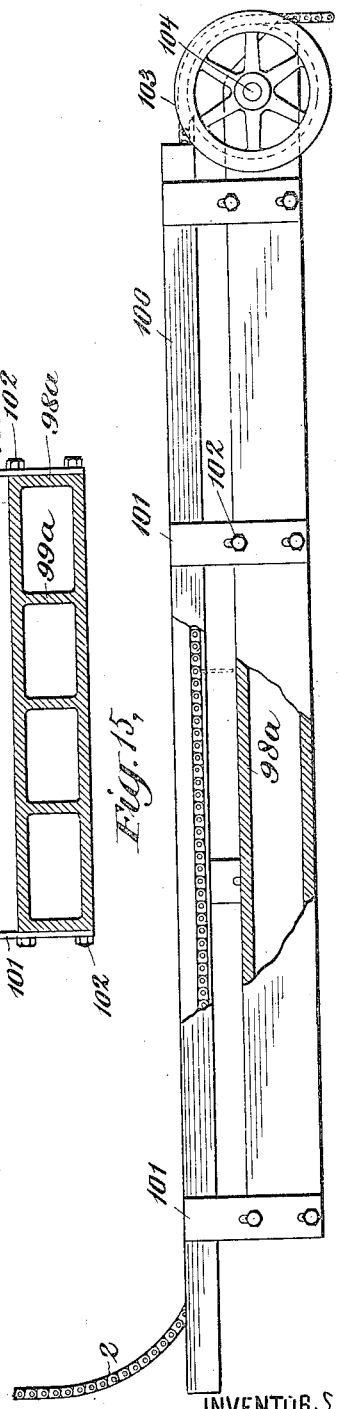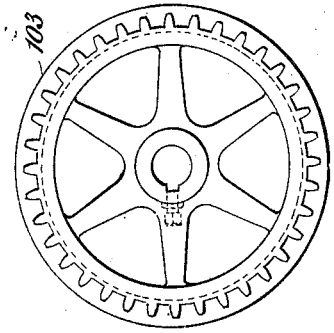

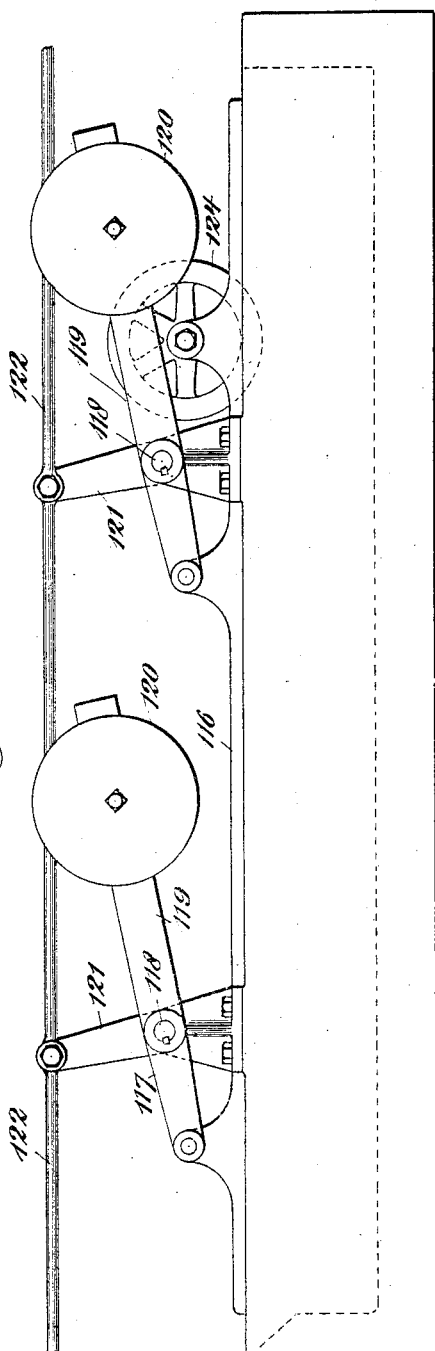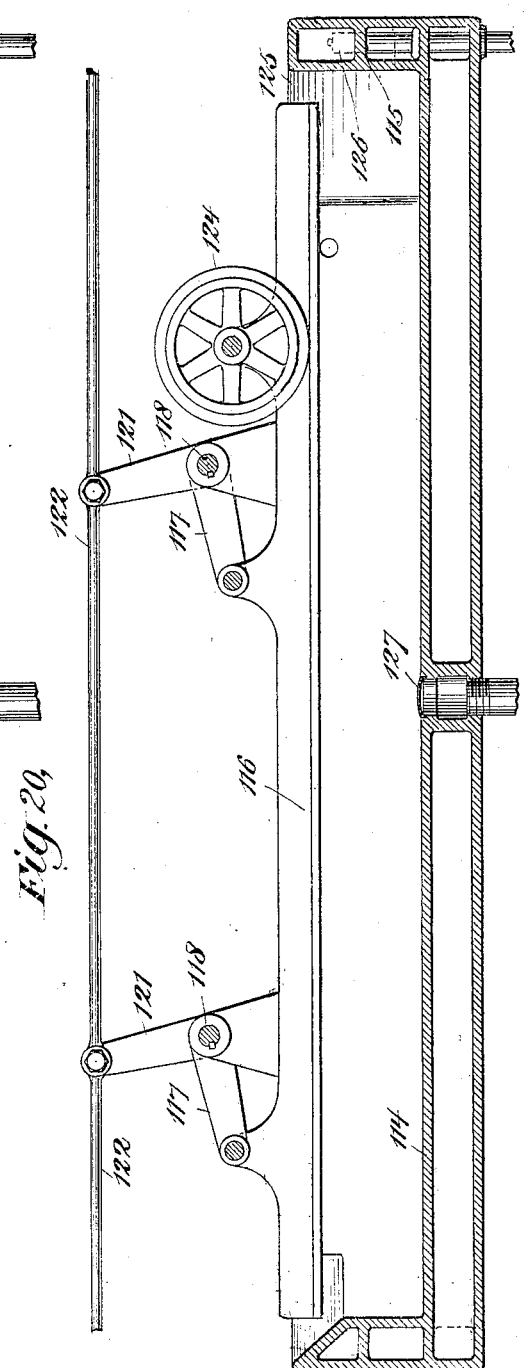

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 11.
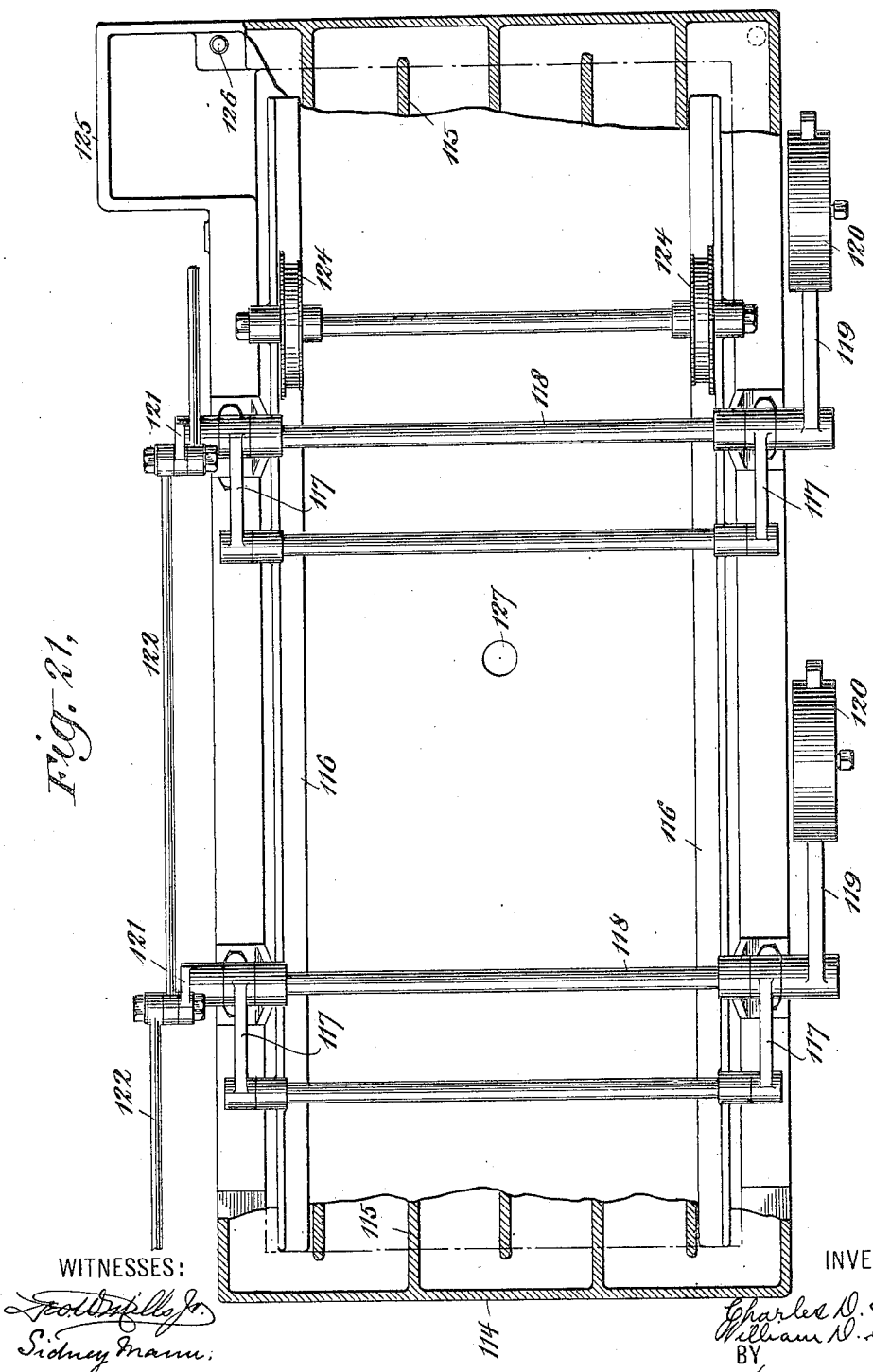
WITNESSES:
INVENTORS
Charles D. Shrady
William D. Stivers
BY
Kenyon & Kenyon
ATTORNEYS.

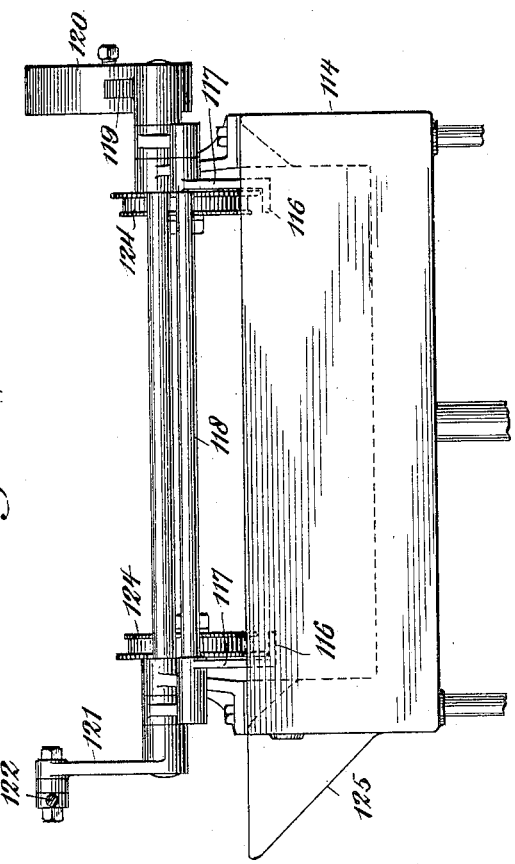

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 13
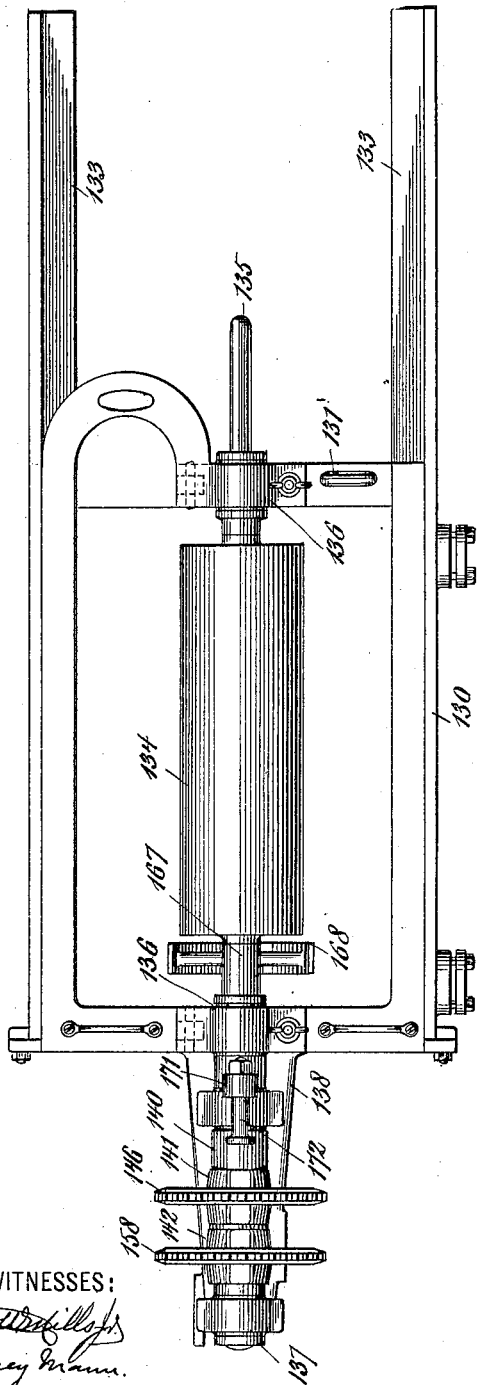
WITNESSES:
INVENTORS
Charles D. Shrady
William D. Stivers
BY
Kenyon & Kenyon
ATTORNEYS.

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 14.
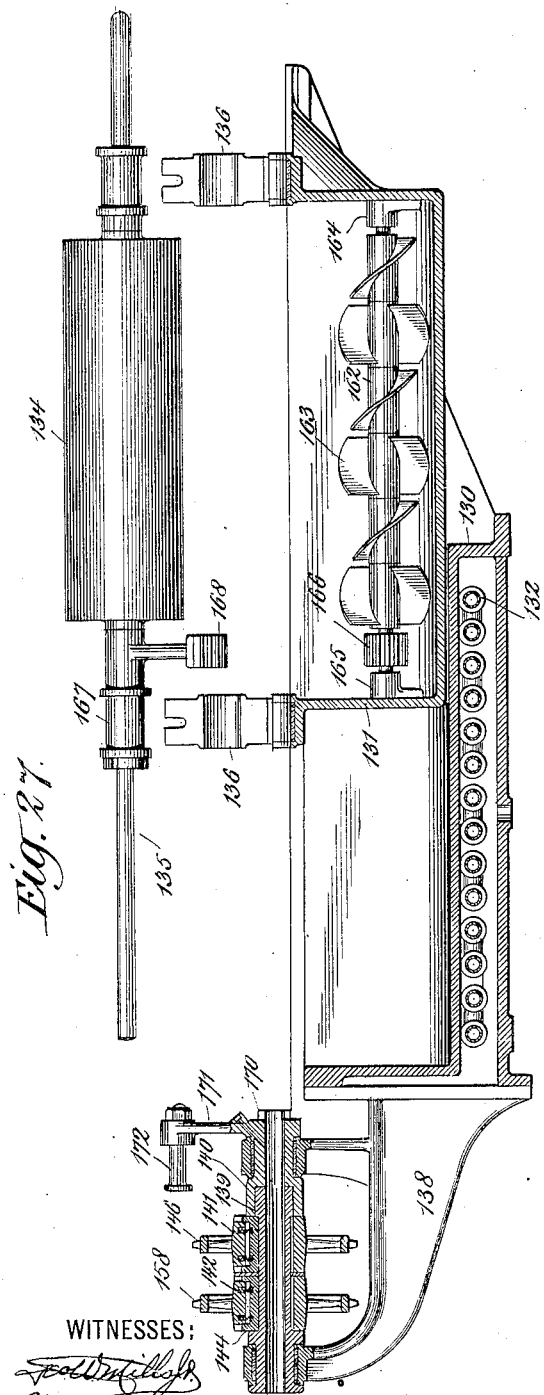
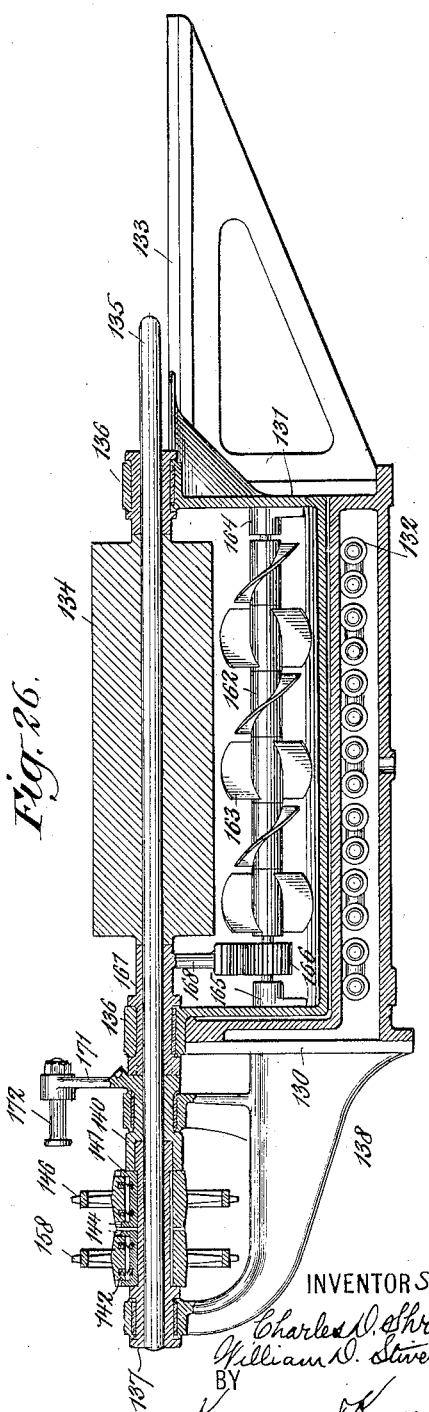

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 15.
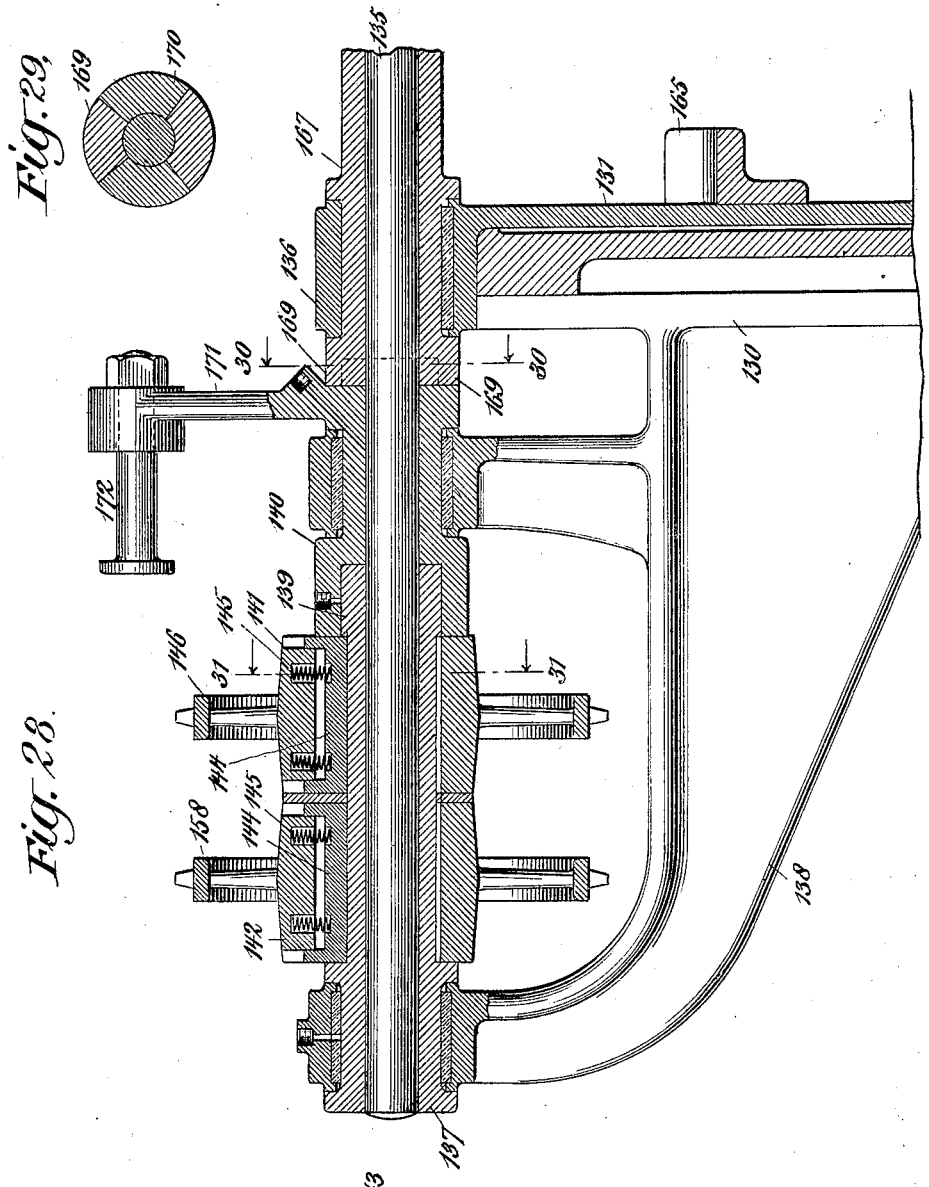
WITNESSES:
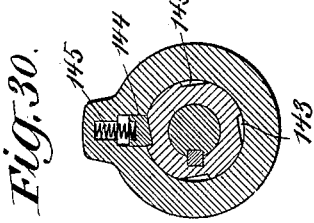
INVENTORS
Charles D. Shrady
William D. Stivers
BY
Kenyon & Kenyon
ATTORNEYS.

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 16.
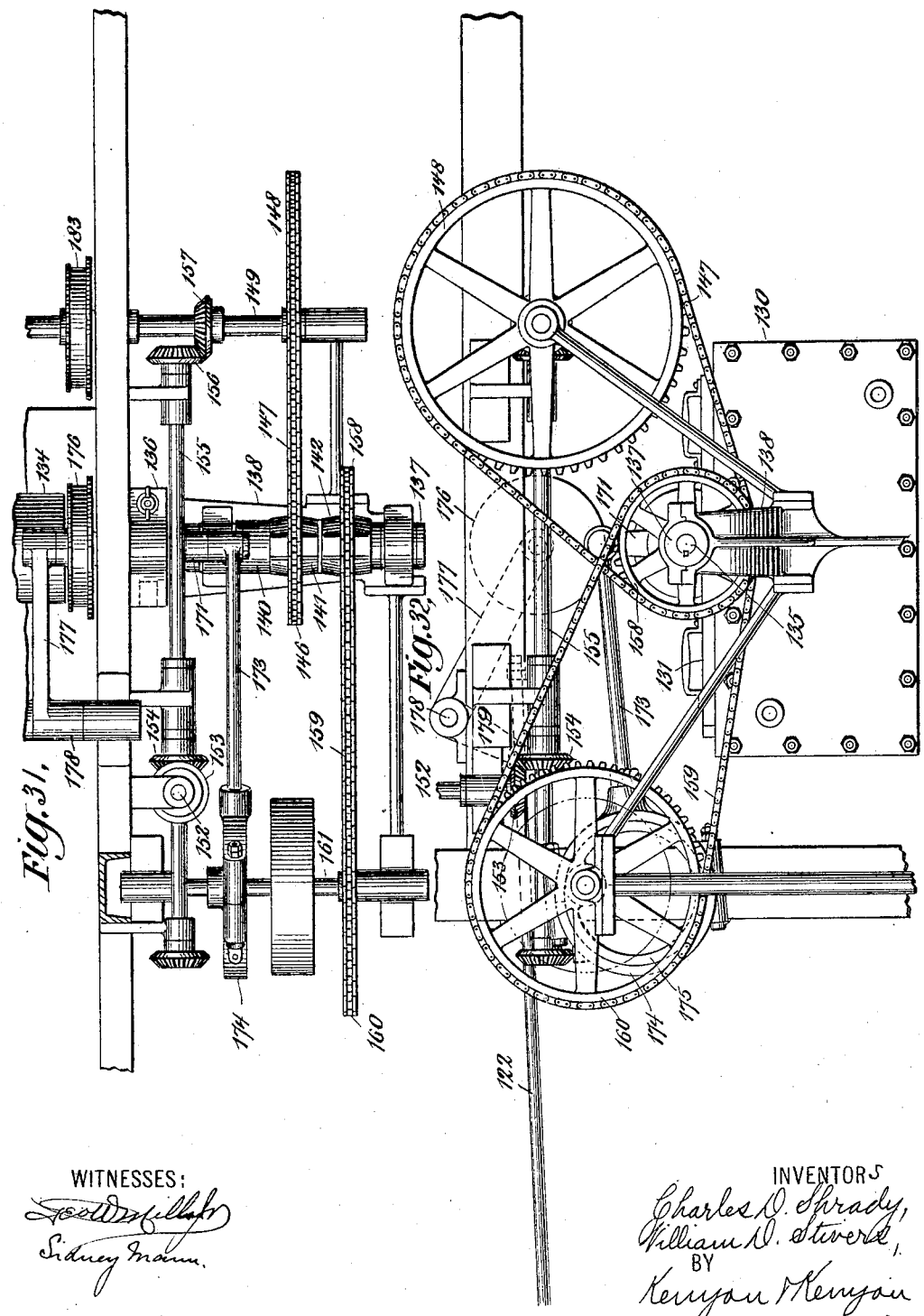
WITNESSES:
INVENTORS
Charles D. Shrady,
William D. Stivers,
BY
Kenyon & Kenyon
ATTORNEYS.

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 17.
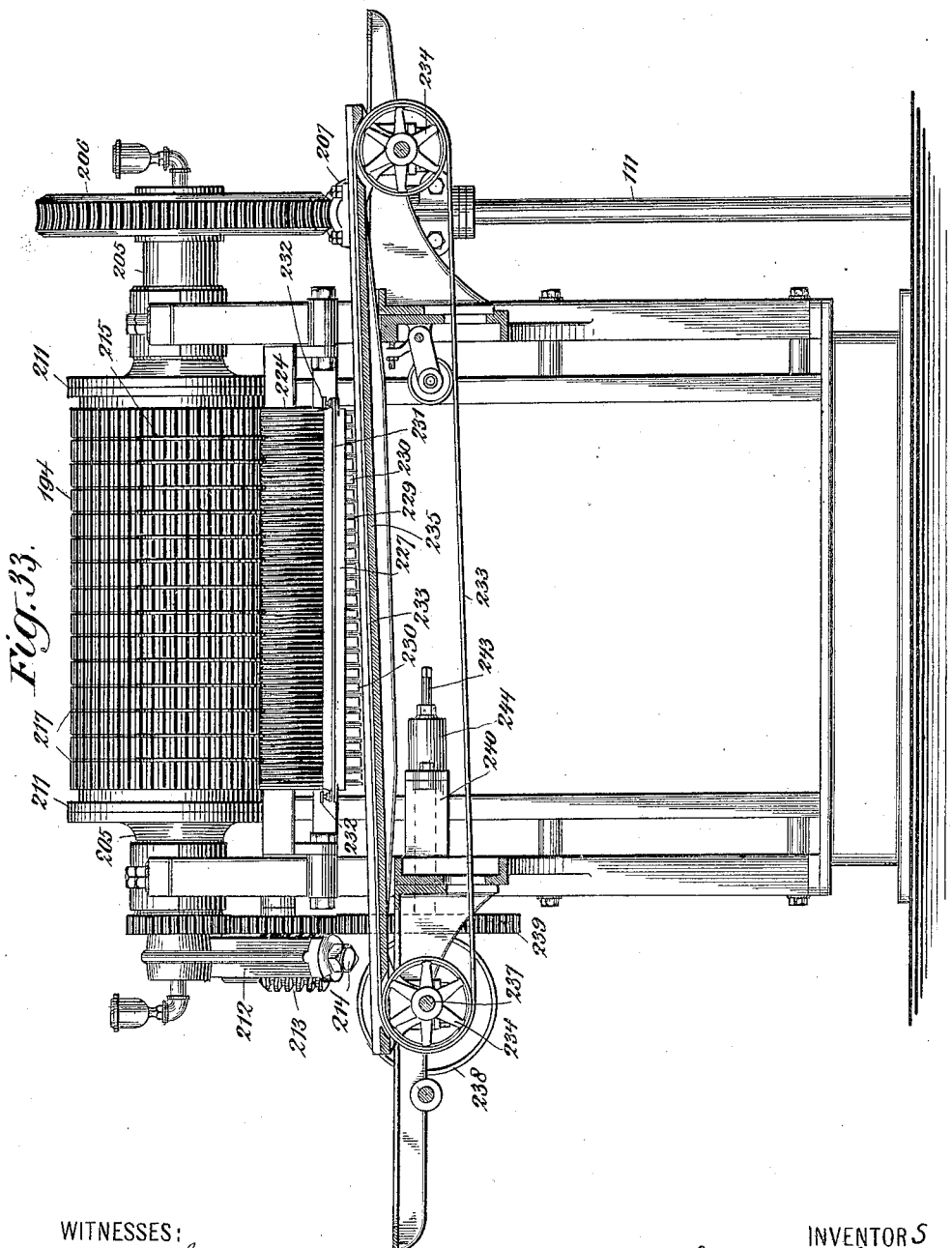
WITNESSES:
INVENTORS
Charles D. Shrady
William D. Stivers
BY
Kenyon & Kenyon
ATTORNEYS No. 827,471. PATENTED JULY 31, 1906.
C. D. SHRADY & W. D. STIVERS.
MATCH MAKING MACHINE.
APPLICATION FILED MAY 2, 1899.

24 SHEETS—SHEET 18.

WITNESSES:

INVENTORS
Charles D. Shrady
William D. Stivers
BY
Kenyon & Kenyon,
ATTORNEYS

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 19.
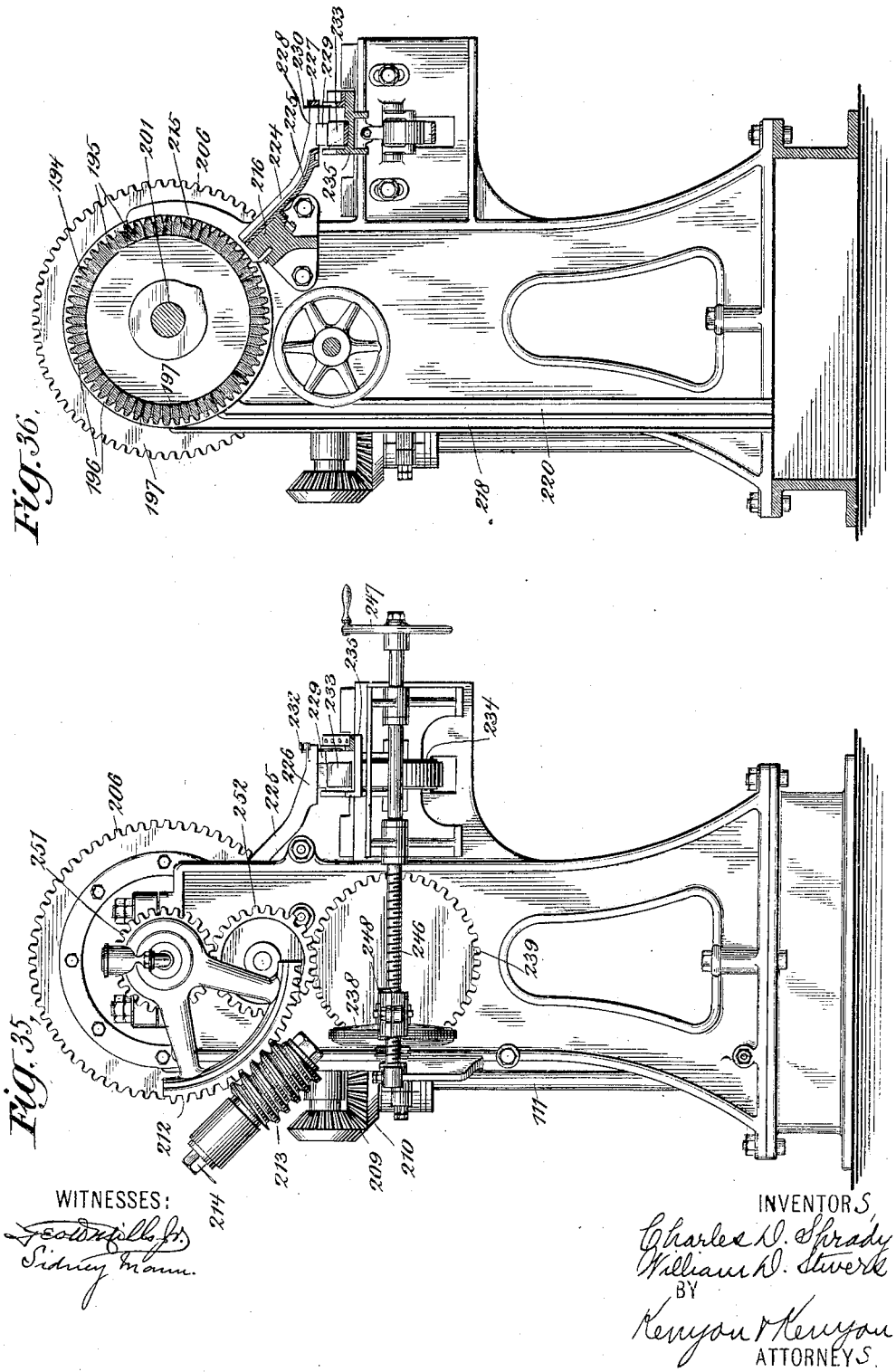
WITNESSES:
INVENTORS
Charles D. Shrady
William D. Stivers
BY
Kenyon & Kenyon
ATTORNEYS No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 20.
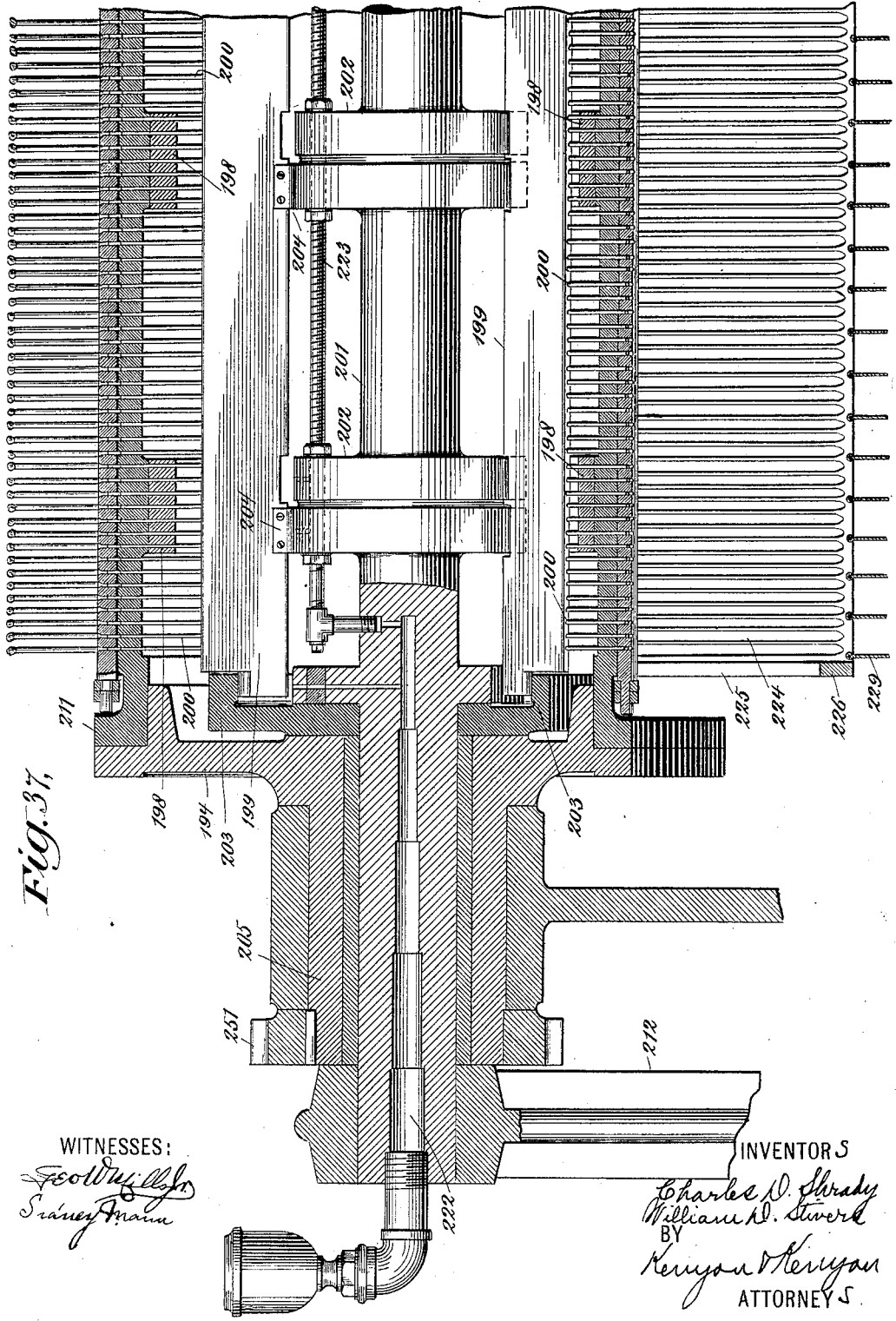
WITNESSES:
INVENTORS
Charles D. Shrady
William D. Stivers
BY
Kenyon & Kenyon
ATTORNEYS

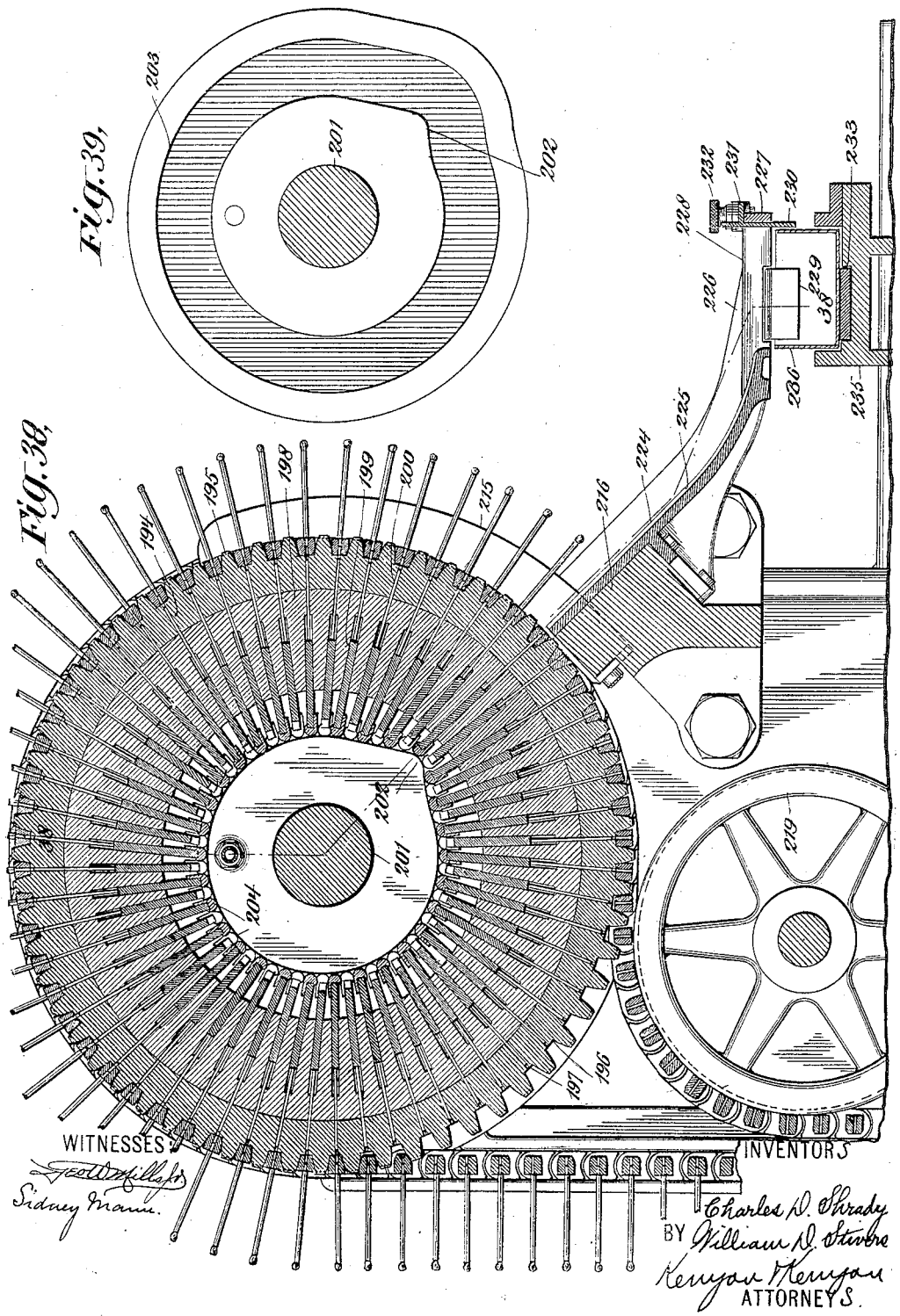

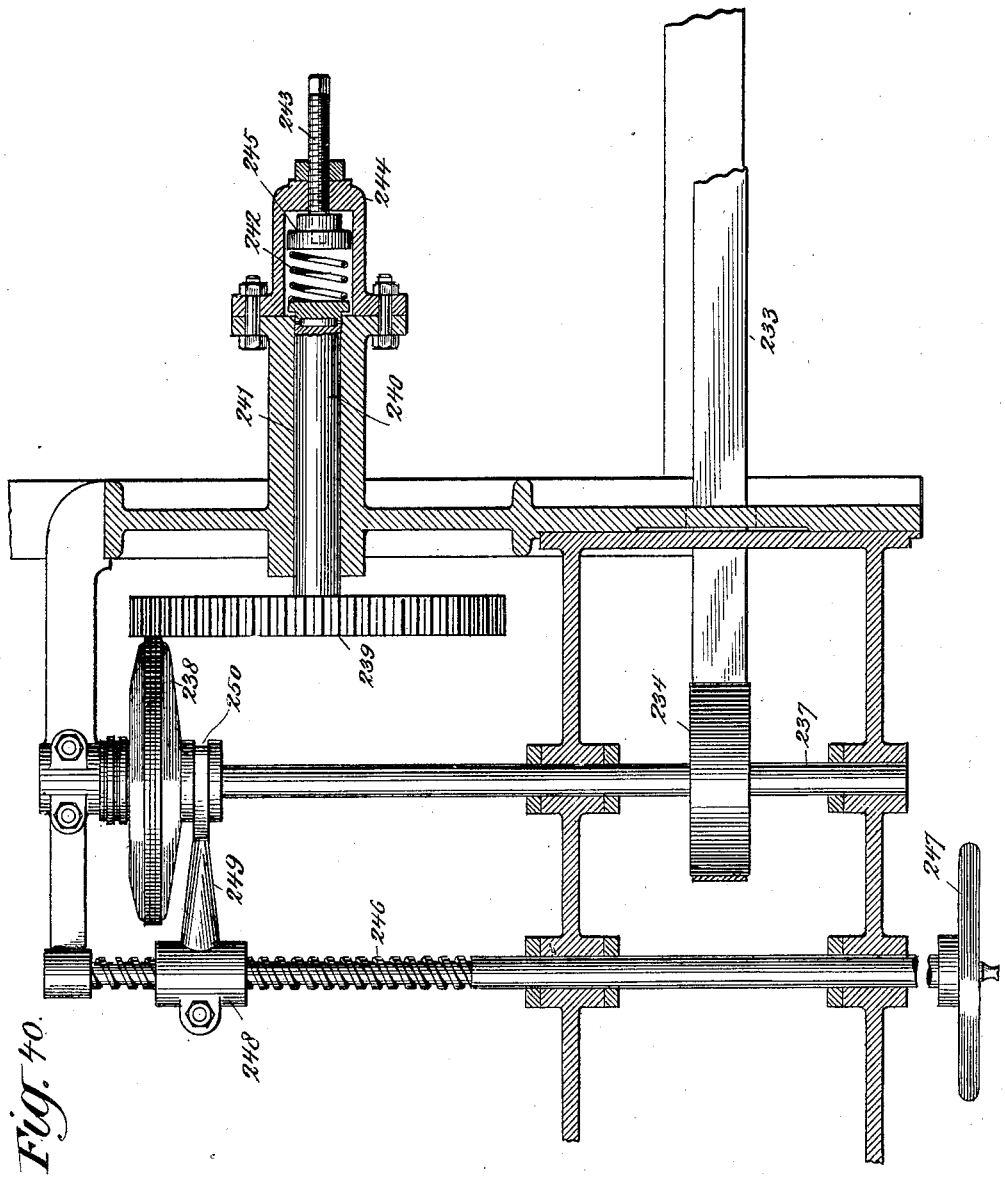

No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 23.
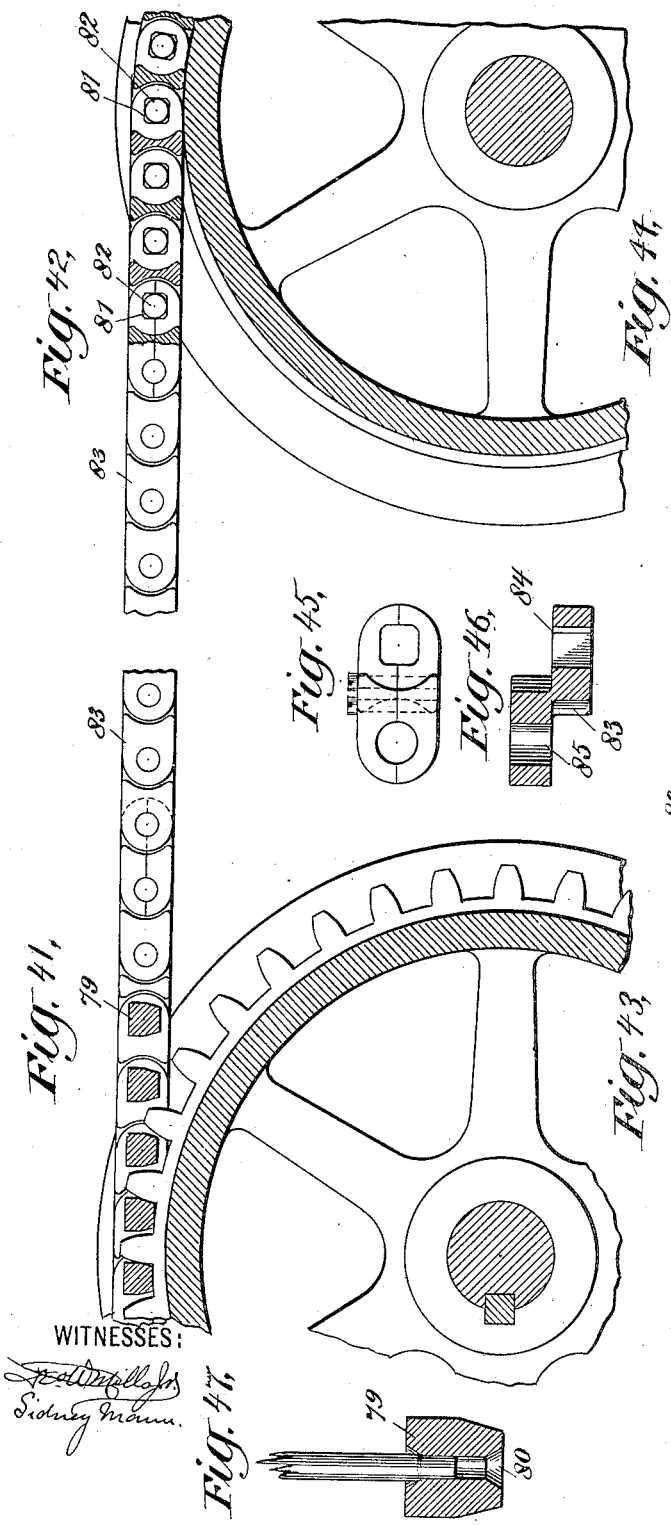
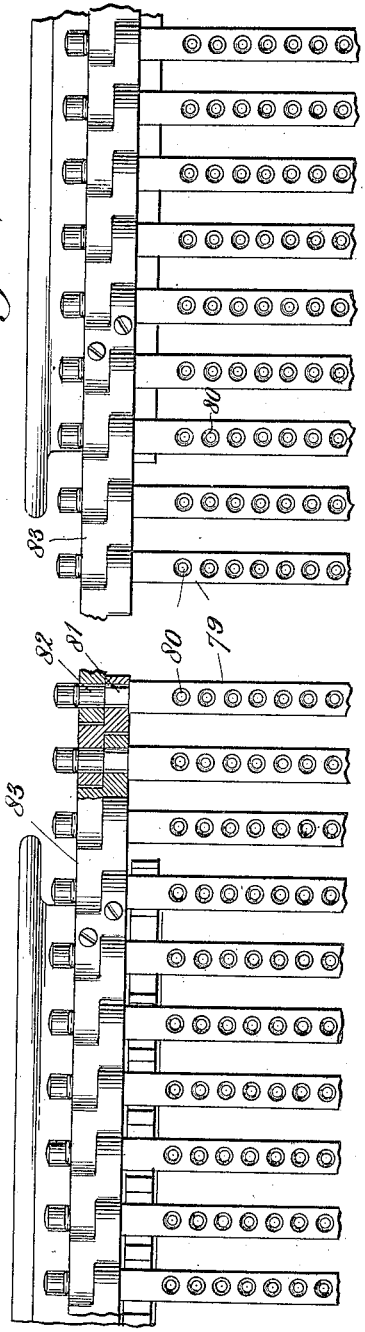
INVENTORS
Charles D. Shrady
William D. Stivers
BY
Kenyon & Kenyon
ATTORNEYS No. 827,471. PATENTED JULY 31, 1906.
C. D. SHRADY & W. D. STIVERS.
MATCH MAKING MACHINE.
APPLICATION FILED MAY 2, 1899.
24 SHEETS—SHEET 24.
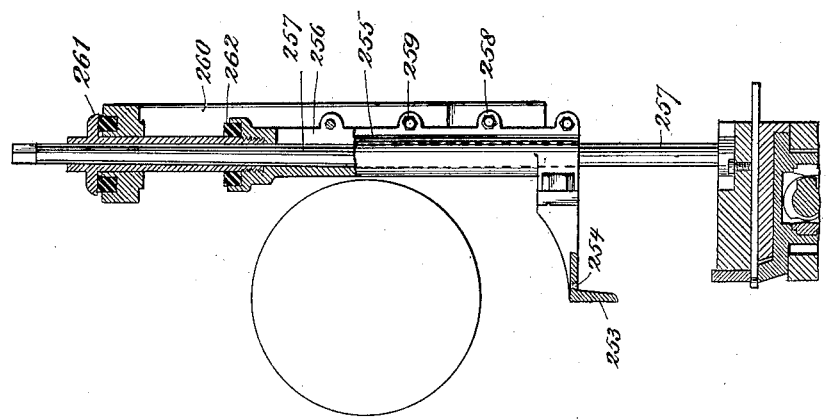
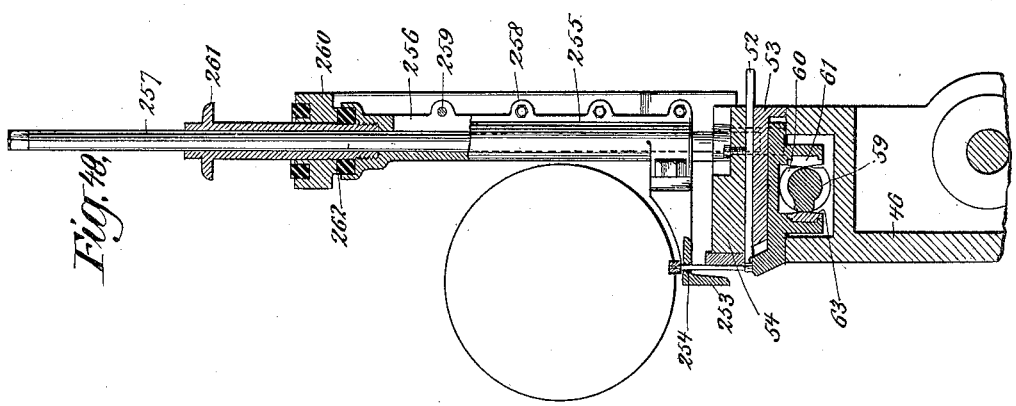
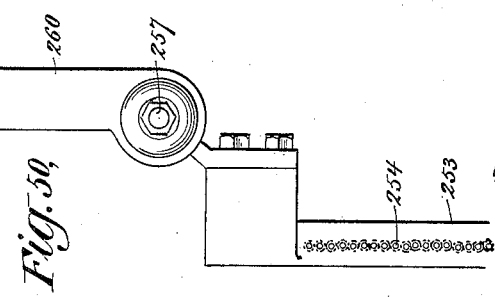
WITNESSES:
INVENTORS,
Charles D. Shrady,
William D. Stivers,
BY
Kenyon & Kenyon
ATTORNEYS.

UNITED STATES PATENT OFFICE.

CHARLES D. SHRADY, OF PASSAIC, AND WILLIAM D. STIVERS, OF JERSEY CITY, NEW JERSEY, ASSIGNORS, BY MESNE ASSIGNMENTS, TO THE DIAMOND MATCH COMPANY, A CORPORATION OF ILLINOIS.

MATCH-MAKING MACHINE.

No. 827,471.  Specification of Letters Patent.  Patented July 31, 1906.

Application filed May 2, 1899. Serial No. 715,268.

*To all whom it may concern:*

Be it known that we, CHARLES D. SHRADY, residing in Passaic, in the county of Passaic, and WILLIAM D. STIVERS, of Jersey City, county of Hudson, State of New Jersey, have invented a new and useful Improvement in Match-Making Machines, of which the following is a full, clear, and exact specification, reference being had to the accompanying drawings, which form a part hereof.

The invention relates to what is known as a "continuous" match-making machine—that is to say, one in which the material is fed by suitable devices to the cutting mechanism, by which it is cut up into splints, which are then inserted into a suitable carrier-chain, and in which the chain then conveys the splints to the various mechanisms by means of which the paraffin and composition are applied to the splints and the match-heads are properly formed and dried, and the completed matches are then ejected from the chain and deposited in the match-trays.

The general purposes and objects of the invention are as follows:

One object of the invention is to provide suitable mechanism for feeding the blocks of wood to the cutters, by means of which the width of the trough through which the material is fed can be varied and adjusted to the size of the material and the angle of direction of feed to the cutters can be changed as desired.

Another object is to provide means for feeding the material through the trough, which is sufficiently yielding to accommodate itself to any variation in the depth of the material and which will thereby prevent the jamming of the material in the trough and the consequent stopping or breakage of the machine.

Another object of the invention is to provide means for properly supporting the splints in the cutters and inserting the splints accurately and reliably in the holes in the bars of the chain and for holding the bars of the chain accurately in position over the cutters so that the holes in the bars will be in line with the splints and so that during the insertion of the splints in the bar the bar will not be turned or moved out of position, but will be held rigidly in place.

Another object of the invention is to provide means for preventing the wood from being forced upward out of the feeding-trough when the cutter-head rises.

Another object of the invention is to provide mechanism for heating the splints after they have been inserted in the chain, so as to make them absorbent and prepare them for receiving the paraffin or other suitable material.

Another object of the invention is to provide suitable mechanism for applying the paraffin or similar substance to the ends of the splints by means of which the paraffin can be kept at suitable temperature and the paraffin can be applied uniformly to all the splints and to any required depth and the chain can be easily lowered into or lifted out of the paraffin-bath and the splints that drop out of the chain and into the bath can be easily removed, so as not to interfere with the continuous operation of the apparatus.

Another object of the invention is to provide suitable mechanism for applying the composition to the ends of the splints, so constructed that the different parts of the mechanism can be readily separated and removed in case the composition should catch fire or such removal was necessary for any other purpose and that the parts can be readily assembled and put into operative connection.

Another object of this part of the invention is to provide apparatus for suitable heating of the composition and keeping it at a proper temperature, for keeping the composition-roller constantly revolving while the machine is in operation, both when the chain is in motion and when it is at rest, for giving the surface of the composition-roller the same speed as the head of the match-splints when the machine is in operation and the composition is being applied, and for continuing the revolution of the roller, though at a slower rate of speed when the chain is at rest and the splints are not in contact with the roller, and for agitating the composition, so as to keep it in suitable condition for application to the splints.

Another object of the invention is to provide suitable means for moving the chain into or out of contact with the composition-roller.

Another object of the invention is to provide suitable mechanism for giving the proper form to the composition after it has been applied to the splints so as to produce match-heads of the desired shape or outline.

Another object of the invention is to provide suitable mechanism for drying the heads of the matches while they are passing from the composition-bath to the discharging apparatus.

Another object of the invention is to provide suitable mechanism for ejecting or discharging the matches from the carrier-chain by means of which the matches are ejected from the chain with rapidity and certainty and the chain is held accurately in position while the ejecting mechanism is in operation.

Another object of this part of the invention is to provide for the gradual discharge of the matches from successive bars while the chain is kept continually in motion.

Another object of this part of the invention is to provide an ejecting mechanism that is not likely to get out of order, and that is compact and at the same time reliable and positive in its operation, and that is capable of being adjusted so as to regulate the point of discharge according to circumstances.

Another object of the invention is to provide mechanism for conveying the matches from the point where they are discharged from the chain to a belt or device for conveying the match-trays past the ejecting mechanism and for depositing the matches in the match-trays in suitable quantities and so that the matches will lie parallel with one another in the trays.

Another object of the invention is to provide suitable mechanism for suitably adjusting the speed at which the match-trays are carried past the ejecting mechanism.

Another object of the invention is to provide an endless carrier-chain of such construction that it can be easily and accurately supported and driven through the machine, that it can be held in position rigidly and accurately when the splints are being inserted and the matches are being ejected, that it can be easily combined with or removed from the other parts of the machine, and that it can be easily repaired or replaced in parts.

Another object of the invention is to provide means whereby the speed of the different parts of the machine can be accurately timed, so that the entire operation can be continuous and no slack portion of any great length be required in the chain.

Another object of the invention is to provide means for simultaneously lifting the chain and the match-splints out of the paraffin-bath and the composition-bath.

The machine is also designed to accomplish other objects which are hereinafter fully set forth.

To this end the invention consists, first, in the combination, with a suitable splint-cutting mechanism, of the feed-table and adjustable side guides adapted to form with the table a feed-trough for the material, and the feed-roller and means for operating the feed-roller, whereby the width of the feed-trough can be varied to suit the particular kind of lumber or material that is being used and the angle of the direction of the feed to the line of the cutters can be changed as may be desired. This part of the invention also consists in the special construction and arrangement of the feed-rollers for feeding the material through the trough and of the means for driving the same. One feature of this part of the invention consists in forming the table in two parts (a stationary part and a movable part,) and in mounting the feed-roller upon the movable part and providing the roller with means for operating it in whatever position the movable part of the table may be placed. This part of the invention also consists in providing the feed-roller with yielding bearings for the purpose of enabling the roller to adapt itself to any irregularities in the thickness of the material.

The invention also consists in the combination, with a suitable carrier-chain, of the cutter-head provided with cutters and an abutment-block adapted to reciprocate back and forth in the recess in the cutter-head and cams for reciprocating the abutment-block back and forth positively at the proper times, so as to move the abutment-block out under the cutter when the splint has been cut and cause it to support the lower end of the splint while the splint is being inserted in the chain and so as to draw the abutment-block back out of the path of the cutter before the cutter descends. This part of the invention also consists in the special construction of the abutment-block and cams and the means for operating the cams in any position of the cutter-head.

The invention also consists in the combination, with a cutter-head and cutters and a carrier-chain consisting of bars each having a single row of holes to receive the match-splints and means for connecting the bars, of the toothed drum to hold the bars rigidly in place while the splints are being inserted therein, the grooves or recesses between the teeth of the drum being of such a size as to receive and fit the bars of the chain, whereby the bars of the chain are held in an exactly proper position to bring their holes in line with the match-splints and the bars are prevented from turning or being forced out of place while the splints are being inserted therein, the drum itself operating to hold the bars of the chain against the thrust or pressure of the splints and the cutters and abutment-block. This part of the invention also consists in the special construction of the teeth or grooves of the drum and the bars and links of the chain and the mechanism for driving the drum, whereby, among other results, the drum is given an intermittent motion and is made to stop when the middle of the link is immediately below the center of the drum and the link is in a horizontal position.

The invention also consists in the combination, with the other necessary parts of the cutting mechanism, of springs adapted to bear against the top of the blocks of wood to prevent their being forced upward by the cutter-head as it rises, and of means to adjust the tension of these springs, and of a suitable stop to limit the upward motion of the springs and to prevent their being permanently bent out of shape.

The invention also consists in the combination, with suitable splint-cutting mechanism and a carrier-chain adapted to receive and convey the match-splints, of a heating mechanism consisting of a suitable radiating or heating device and ways supported at a suitable distance from the radiating or heating device, these ways being made adjustable, so as to regulate the distance between the splints and the radiating device.

The invention also consists in the combination, with the other necessary parts, of mechanism for applying the paraffin or similar substance to the splints, comprising a suitable pan or device to hold the substance, means for heating the pan, movable ways on which the chain is adapted to slide or be carried, and suitable means for raising and lowering the ways whereby the depth to which the splints are inserted in the paraffin can be accurately regulated and the material can be uniformly applied to all the splints. This part of the invention also consists in a special means for supporting and moving the ways. It also consists in providing the rear end of the pan with a lip to receive or catch any splints that may have fallen out of the chain while the chain is passing through the paraffin device.

The invention also consists in the combination, with the other necessary parts, of mechanism for applying the composition to the splints, comprising a jacket, means for heating the jacket, a removable pan to hold the composition adapted to fit into the jacket, and a composition-roller mounted in bearings in the pan and adapted to be removed from the pan, whereby the different parts can be separated from one another in case the composition should catch fire or such separation should become desirable for any other reason, and the parts can thereafter be reassembled, and all this can be done easily and expeditiously. This part of the invention also consists in the special construction of the jacket and pan. It also consists of means for continuously revolving the composition-roller, whether the chain is in motion or at rest. In the best form of the invention two separate means are provided for revolving the roller, one adapted to revolve the roller when the chain is in motion and the composition is being applied to the splints and to give to the surface of the roller the same speed as that of the heads of the match-splints, and the other means being adapted to continue the revolution of the roller when the chain is at rest or for any reason the composition is not being applied to the splints, the speed of the roller being at this time less than when the chain is in operation and the composition is being applied. This part of the invention also consists in the combination, with the other necessary parts, of movable guide-wheels to press the chain toward the composition-roller and means to move and support the guide-wheels. It also consists in the combination, with the other necessary parts, of a removable agitator adapted to oscillate in bearings in the pan and in the means for oscillating the agitator. It also consists of the special construction of the composition-roller and agitator and the devices for driving the same, whereby these parts can be easily separated from one another and then reassembled when desired.

The invention also consists in the combination, with suitable mechanism for applying the composition to the ends of the splints, of two or more rows of guide-wheels arranged vertically and at a proper distance from the composition mechanism, whereby after the composition has been applied to the splints chain passes in a substantially horizontal direction from the wheels of one row to the wheels of another row alternately, and the position of the splints is alternately reversed, so that the composition is first caused to flow lengthwise of the splints in one direction and then lengthwise of the splints in the opposite direction, whereby the composition is made to assume the proper size and form. This part of the invention also consists in employing, in addition to the above, two rows of guide-wheels arranged horizontally, whereby after the composition has been made to flow lengthwise of the match-splint in one direction and then in the opposite direction, as above explained, it is thereafter made to flow crosswise of the splints in one direction and then crosswise of the splints in the opposite direction, thus giving to the match-heads a well-rounded and perfect form.

The invention also consists in drying mechanism for drying the match-heads after the composition has been applied, comprising an inclosed perforated box placed in proximity to the chain and an air pump or exhauster connected with the box, whereby a current of air is forced over or past the heads of the matches.

The invention also consists in the combination, with a carrier-chain adapted to carry the match-splints and suitable means for supporting and driving the chain, of a revolving toothed drum adapted to receive and carry the chain and means within the drum adapted to eject the matches from the chain. This part of the invention also consists in the special construction of the drum and of the ejecting mechanism within the drum and of the means for operating the ejecting mechanism. One feature of this part of the invention consists in so constructing the drum and the ejecting mechanism that the matches will be ejected from the chain gradually while the drum is revolving, whereby the drum can be revolved continuously and the matches can be continuously and rapidly discharged from the chain at any suitable point. Another feature of this part of the invention is the use of supporting-arms to bear against the outer surface of the bars of the chain where the splints are ejected and to hold the bars against the outward pressure of the ejecting mechanism and to prevent their being forced out of place during the operation of discharging the matches.

The invention also consists in the combination, with the other necessary parts, of means to convey the match-trays past the drum, chutes or ways leading from the place where the matches are discharged from the chain to the belt or tray-conveyer, and plates hinged to a stationary part of the machine at the outer end of the chutes to guide the matches into the drums and to keep them parallel, so that they will not lie crosswise in the trays. This part of the invention also consists in employing a stop-plate at the opposite end of the hinged plates from the chutes and in making this stop-plate adjustable. The invention also consists in means for regulating the speed of the belt or tray-conveyer.

The invention also consists in the special construction of the carrier-chain, the same consisting of perforated bars provided at their ends with an angular portion and a rounded portion and the connecting-links provided at one end with an opening adapted to fit the angular portion of one bar and at the other end with an opening adapted to fit or receive the rounded portion of the adjoining bar, whereby each link is adapted to turn on one bar, but not to turn on the adjoining bar, whereby, among other results, the chain is adapted to be held more exactly in position when the splints are being inserted therein.

The invention also consists in certain other features of construction and combinations of parts hereinafter fully described and claimed.

The invention is fully shown in the accompanying drawings, in which—

Figure 1 is a diagrammatic side elevation of the entire machine. Fig. 2 is a detail view, partly in horizontal section, of the drying mechanism. Fig. 3 is a diagrammatic top view of the machine, the discharging mechanism being omitted. Fig. 4 is a horizontal section on the line 4 4 of Fig. 1. Fig. 5 is a front view of the cutting mechanism. Fig. 6 is a top view of the cutting mechanism. Fig. 7 is a detail front view of a portion of the feeding mechanism, certain parts being shown in section. Fig. 8 is a detail view of the bearings of the upper feed-roller. Fig. 9 is a side elevation of the cutting mechanism. Fig. 10 is a transverse section of the parts of the machine shown in Fig. 9. Fig. 11 is a detail longitudinal section of a portion of the cutting mechanism, a part of the section being taken centrally of the toothed drum and the other part being taken centrally of the main driving-shaft of the machine. Fig. 12 is a detail transverse sectional view of the revolving drum and cutter-head. Figs. 13 and 14 are detail views of the cutters. Fig. 15 is a side elevation, partly in longitudinal section, of the heating mechanism. Fig. 16 is a horizontal section of the same. Fig. 17 is a transverse section of the same. Fig. 18 is a detail view of one of the guiding and driving rollers. Fig. 19 is a side elevation of the mechanism for supplying the paraffin or other similar substance. Fig. 20 is a central longitudinal section of the same. Fig. 21 is a top view of the same, partly in horizontal section. Fig. 22 is a front elevation of the same. Fig. 23 is a top view of the mechanism for applying the composition. Fig. 24 is a side elevation of the same. Fig. 25 is a transverse section of the same. Fig. 26 is a central longitudinal section of the device for applying the composition, showing the parts in operative position. Fig. 27 is a similar view showing the parts separated. Fig. 28 is an enlarged detail view of the mechanism for driving the composition-roller and the agitator. Fig. 29 is a detail section on the line 30 30 of Fig. 28. Fig. 30 is a detail section on the line 31 31 of Fig. 28. Fig. 31 is a top view of the mechanism for driving the composition-roller and the agitator. Fig. 32 is a side elevation of the same. Fig. 33 is a front view of the discharging mechanism. Fig. 34 is a top view of the discharging mechanism. Fig. 35 is a side view of the same looking from the left-hand side of the machine. Fig. 36 is a transverse section of the mechanism shown in Fig. 35. Fig. 37 is a partly longitudinal section through the center of the discharging-drum on the line 38 38 of Fig. 38. Fig. 38 is an enlarged transverse sectional view of the discharging-drum and ejecting mechanism and connected parts. Fig. 39 is a detail view of one of the cams within the drum. Fig. 40 is a view in horizontal section of the mechanism for driving the belt for carrying the match-trays. Fig. 41 is a detail view of the chain and the guiding and driving wheels. Fig. 42 is a detail view of the chain and one of the guide-wheels. Fig. 43 is a top view of the parts shown in Fig. 41. Fig. 44 is a top view of the parts shown in Fig. 42. Fig. 45 is a side view of one of the separable links. Fig. 46 is a horizontal sectional view of one of the ordinary links. Fig. 47 is a sectional view of one of the bars of the chain, showing a match-splint inserted therein. Fig. 48 is a detail sectional view of the cutter-head and guide-plate, showing the guide-plate in the highest position. Fig. 49 is a similar view showing the guide-plate in its lowest position. Fig. 50 is a partial top view of the guide-plate.

Similar numerals represent corresponding parts in the different figures.

Referring to Figs. 1 to 4, which are diagrammatic views of the machine, 1 is the cutting mechanism by means of which the material is cut into splints, and these splints are inserted in the carrier-chain. 2 is the carrier-chain. 3 is the heating mechanism by means of which the splints are heated and thereby made absorbent and otherwise prepared for receiving the paraffin or similar material. 4 is the mechanism for applying the paraffin or other similar substance. 5 is the mechanism for applying the composition. 6 6 represent the mechanism for giving proper form to the match-heads. 7 is the mechanism for drying the matches, and 8 is the mechanism for discharging the matches from the carrier-chain into the match-trays.

The cutting mechanism is fully shown in Figs. 5 to 14. Referring to these figures, 9 is the frame of the machine. 10 and 11 represent a feed-table over which the material is constantly fed to the cutters. 10 is a stationary part of the table, and 11 is a movable part of the table. The movable part 11 is supported upon the stationary part in any suitable way. For example, the stationary part is provided with undercut grooves 12, in which slide the arms 13, which project from the end of the movable part of the table. 14 14 are adjustable side guides which are adapted to be moved upon the surface of the feed-table and to form, with the table, a trough through which the material is fed to the cutters. The table is provided with undercut grooves 15, and the side guides are provided with the slots 16.

17 17 are bolts which pass through the slots in the side guides and into the grooves in the table, the lower end of the bolts being provided with heads, as shown in Fig. 5. As a result of this construction the side guides can be moved in any desired manner upon the surface of the feed-table, the bolts 17 sliding in the grooves 15 and the slots 16, and the side guides can then be fastened in place by screwing down the nuts 18 on the bolts.

19 is a follower adapted to press the material forward under the feed-roller. The follower projects through a slot 20 in the feed-table and is pressed against the material by a weight 21, which is connected with the follower by a cord 22, passing over the pulley 23. (See Fig. 7.)

24 is a feed-roller which is preferably provided with longitudinal teeth adapted to catch upon the top of the material. The shaft of the feed-roller is mounted in bearing-blocks 25. (See Fig. 8.) These bearing-blocks are adapted to slide on suitable ways 26, supported from the frame of the machine. 27 is a screw the lower end of which is tapped into the bearing-block 25.

28 is a sleeve through which the screw 27 is adapted to slide. The sleeve 28 is screw-threaded on its outer surface and is adapted to turn in a screw-threaded opening in the pedestal 29. The pedestal is carried by the frame of the machine.

30 is a lock-nut on the sleeve adapted to lock the sleeve in any desired position.

31 is a nut adapted to turn on the upper end of the screw 27.

32 is a coiled spring encircling the screw 27 and bearing at its lower end against the bearing-block 25 and at its upper end against the sleeve 28.

By turning the nut 31 upon the screw 27 the bearing-block 25 can be raised or lowered in position, and the position of the feed-roller can be thus adjusted so as to give a proper normal depth to the feed-trough. By turning the sleeve 28 in the screw-threaded hole in the pedestal and at the same time turning the nut 31 upon the screw 27 the tension of the coiled spring 32 can be varied, so as to make the feed-roller more or less yielding as against the upper pressure of the material in the feed-trough and without altering the position of the feed-roller. By this construction the feed-roller is permitted to give in an upward direction in case the blocks under it vary in depth, and the jamming or stopping or breakage of the machine is thereby avoided.

33 is a worm-wheel mounted upon one end of the shaft of the feed-roller. This worm-wheel meshes with an intermittent worm 34, which is carried by the shaft 35, which is adapted to revolve in a bearing in the movable part of the feed-table.

36 is a shaft adapted to turn in a bearing in the frame of the machine.

37 is a universal connecting device which joins the shafts 35 and 36 and causes them to revolve together. Any well-known form of universal joint or connection may be employed for this purpose. The lower end of the shaft 36 is provided with the spiral gear-wheel 38, which meshes with the spiral gear 39 on the driving-shaft 40 of the cutting mechanism. The connection between the driving-shaft and the worm-wheel on the shaft of the feed-roller is in this way always maintained, and the feed-roller is properly driven, no matter what position the feed-table may be in.

The intermittent worm 34 is so constructed as to feed the material forward at the proper intervals relatively to the reciprocation of the cutters. In the form shown in the drawings one-third of this intermittent worm is inclined, so as to cause the feed-roller to revolve or advance, and the other two-thirds of the worm are straight, so as not to revolve the feed-roller.

41 is a lower feed-roller. (See Fig. 7.) This roller projects upward to a slight extent through an opening in the feed-table, so as to bear upon the under side of the material opposite the upper feed-roller. The roller 41 is preferably provided with a smooth surface and is mounted in bearings in the movable part of the feed-table. It is provided at one end with the gear 42. 43 is a gear-wheel at one end of the shaft of the upper feed-roller. The gear 42 is connected with the gear 43 by means of the intervening gears 44 and 45. By this means the lower feed-roller is driven from the upper feed-roller and at a proper relative speed. As a result of this construction the size of the way or trough through which the blocks of wood are fed to the cutters can be accurately adjusted to the size or width of the blocks and the angle of direction of the feed to the line of the cutters can be varied according to the character of the match-splints which are to be formed. As the angle of the trough is changed it becomes necessary to change the width of the trough, if it is intended to feed enough wood to supply all the cutters of the machine. The advantage of being able to adjust the angle at which the blocks are fed to the cutters is that the size of the groove in the match-splint can thereby be increased or decreased. The splint can be provided with a deeper groove, the splint itself being thereby made smaller, or the groove in the splint can be made more shallow, the splint being made more nearly like a solid stick. By means of the adjustable side guides the trough can be made wider or narrower, so as to adapt it to the particular kind of lumber that is being used. The lumber varies in size, and by the construction described the trough can be made to properly fit whatever lumber happens to be used. The adjustment of the angle of the feed is also aided by having one part of the feed-table movable and mounting upon it the feed-rollers and so connecting these rollers with the driving-shaft of the machine as to operate the rollers uniformly no matter what position the table may be moved to.

46 is the cutter-head, which is adapted to be reciprocated up and down and to carry the cutters and the abutment-block.

47 47 are crank-arms connected with the driving-shaft 40.

48 48 are connecting-rods connected at their lower ends with the crank-arms and pivoted at their upper ends to the cutter-head, as shown in Fig. 5. These connecting-rods are provided with turnbuckles 49, by means of which the connecting-rods can be lengthened or shortened, and the throw of the cutter-head can thereby be regulated.

50 50 are counterweights on the main driving-shaft. The cutter-head reciprocates up and down the ways or guides 51 in the frame of the machine.

Referring to Figs. 9 to 14, 52 52 are cutters, which are held in grooves in the holding-plate 53. The cutters are placed in these grooves and are fastened in their position by means of the clamping-plate 54. Each cutter is provided with a series of holes 55, into which the set-screws 56 project. The set-screws pass through holes in the clamping-plate 54. By this means the position of the cutters can be adjusted. 57 is a guide-plate which is secured to the face of the clamping-plate and is provided with grooves, one for each splint 58 is an abutment-block which is reciprocated back and forth in a recess in the cutter-head. The abutment-block is provided with two depending portions, between which is a cam-shaft 59. The cam-shaft carries four cams, two adapted to force the abutment-block out positively underneath the cutter and the other two adapted to force the abutment-block back positively into the recess in the cutter-head, so as to withdraw the abutment-block from underneath the cutter. 60 60 are the two cams at the middle of the shaft adapted to bear against the slippers 61 and to force the abutment-block into the recess. 62 62 are the two cams, one at each end of the shaft, which are adapted to bear against the slippers 63 and to force the abutment-block out underneath the cutters. The forward end of the abutment-block has an upwardly-projecting portion which is adapted to be in contact with the under side of the cutters. The cam-shaft is mounted in bearings in the cutter-head and carries at one end the miter-gear 64, which meshes with the miter-gear 65, which is carried by the sleeve 66. This sleeve is adapted to revolve in a bearing in the bracket 67, which is secured to the cutter-head and rises and falls therewith. The sleeve 66 is keyed to the vertical shaft 68 so as to revolve with that shaft, but to slide thereon. The shaft 68 is mounted in suitable bearings in the frame of the machine and carries to its lower end the miter-gear 69, which meshes with the miter-gear 70 on the main driving-shaft 40.

71 is a toothed drum which is mounted in suitable bearings in the frame of the machine above the cutter-head. The teeth 72 of the drum extend lengthwise of the drum from end to end, and these teeth and the grooves 73 in the drum formed thereby are constructed in a special manner, as shown in Fig. 12, so that these grooves will be of such a size and shape as to exactly receive and fit the bars of the carrier-chain. The sides of the teeth are curved or beveled, so as to enable the bars of the chain to easily slip into or out of the grooves 73. The bottom of each groove 73 is in such a plane that it will be in a horizontal position when it is immediately over the cutters and will form a solid surface to bear against every part of the upper surface of the bar when the splints are being inserted and will also be perpendicular to the line of motion of the cutters, as a result of which the drum will hold the bar accurately and rigidly in position when the splints are being inserted therein.

The drum is driven intermittently by means of the worm-wheel 74, mounted on the end of the shaft of the drum. This worm-wheel meshes with an intermittent worm 75, carried by the vertical shaft 76, which is mounted in suitable bearings in the frame of the machine. At the lower end of the shaft 76 is the spiral gear 77, which meshes with the spiral gear 78 on the driving-shaft 40. One half of the intermittent worm 75 is inclined, so as to revolve the drum, and the other half is straight, so as to hold the drum rigidly in position.

The construction of the carrier-chain by means of which it coöperates with the drum is clearly shown in Figs. 41 to 47. 79 79 are the bars of the carrier-chain. Each bar is provided with a single row of holes 80, adapted to receive the match-splints. These holes are beveled at both ends, as shown. The corners of the bars on the side opposite to that on which the splints are inserted are beveled, as shown in Fig. 47. The ends of the bars are provided with an angular portion 81 and a rounded portion 82. (See Figs. 42 and 43.) 83 83 are the links which connect the bars of the chain. The construction of these links is shown in cross-section, Fig. 46. One end of the link is provided with an opening 84, which is angular in shape and made to fit the angular portion 81 of the bar, so that the link cannot turn upon the bar, but the bar and link must turn together. The other end of the link is provided with an opening 85, which is adapted to fit the round portion 82 of the adjoining bar, whereby the link is enabled to turn upon the adjoining bar. The links and bars are combined, as shown in Figs. 41 to 44, the links overlapping one another. As a result of this construction each link is adapted to turn on one bar, but not to turn on the adjoining bar. Some of the links are made separable, as shown in Fig. 45, so that the chain can be taken apart for purposes of repair or replacement of parts.

The circular pitch of the teeth of the drum 71 is the same as the pitch of the bars of the carrier-chain, and the teeth of the drum are adapted to exactly and successively fit in between the successive bars of the chain. The intermittent worm 75, by means of which the drum is driven, is so constructed and arranged as to give the drum an intermittent motion and to stop the drum when the middle of the link 83 of the carrier-chain is immediately below the center of the drum. As a result of this the link is held in a horizontal position, and as the bar 79 of the carrier-chain, which is connected with the forward end of the link, cannot turn in the link the bar is thereby held rigidly in a horizontal position, so that the holes of the bar are in a vertical position immediately over the splints, whereby the splints are forced accurately into the holes of the bar, the vertical center line of the bar being in line with the center of the movement of the splints.

253 is a guide-plate provided with the perforations 254. (See Figs. 48 to 50.) These perforations are countersunk at their lower ends, so as to have wide or flaring mouths. At their upper ends they have a diameter somewhat less than the diameter of the lower end of the holes in the bars of the carrier-chain. The plate 253 is secured at its ends to the tubes 255, which are split longitudinally at 256.

257 257 are rods secured at their lower ends to the cutter-head, so as to rise and fall with the cutter-head, and passing through the split tubes 255. The tube 255 is provided with the perforated ears 258 on opposite sides of the slot or split. Bolts 259 pass through these ears. By turning these bolts the tube 255 can be closed around the rod 257 and any required amount of friction produced.

260 260 are brackets supported from the frame of the machine. Each bracket has a bearing in which the tube 255 slides up and down 261 and 262 are collars or shoulders on the tubes 255 to limit their up-and-down motion in the brackets. The friction of the tube upon the rod is so regulated that the tube will rise and fall with the rod until one of the collars of the tube strikes the bracket, when the tube will remain stationary and the rod will slide through it. When the cutter-head descends, it carries with it the tubes 255 and the plate 253 until the collar 261 strikes the top of the bracket, this moving the plate 253 out of the path of the splints just inserted in the chain. The plate 253 then remains in that position until the chain has been moved forward by the drum 71 and another bar brought into position to receive a row of splints. The cutter-head then rises and carries with it the tubes 255 and plate 253 until the collar 262 strikes the under side of the bracket. The plate 253 remains in that position, the rods 257 sliding through the tubes and the cutter-head rising and forcing the splints first into and through the perforations in the plate 253 and then into the holes in the bars of the chain. The plate 253 thus aids in guiding the splints into the holes in the bars.

85ª 85ª are guide-wheels mounted in bearings at the front of the cutting mechanism, over which the chain passes before reaching the drum.

86 86 are guide-wheels mounted in suitable bearings at the rear of the drum over which the chain passes after leaving the drum. These guide-wheels hold the chain in the proper lateral position.

After a row of splints has been cut off from the block of wood 87 and inserted in a bar of the carrier-chain, the parts being in the position shown in Fig. 12, the wood is fed forward by the feeding devices, the abutment-block 58 is drawn back into the recess in the cutter-head by the operation of the cams 60. The cutter-head then descends and cuts off another row of splints, the splints after passing through the cutters being held in the grooves in the guide-plate 57. When the cutter-head descends, it carries down the guide-plate 253 to a point below the lower ends of the splints just inserted in the chain, so as to enable the chain to be moved forward. The cutter-head then rises and the abutment-block is forced out again underneath the ends of the cutters by the operation of the cams 62, so as to support the lower ends of the splints. Meanwhile the drum has been revolved so as to bring the following bar of the carrier-chain into position immediately over the line of splints, the middle of the next link 83 being brought immediately under the center of the drum. As the cutter-head rises the guide-plate 253 also rises until it is stopped by the collar 262 striking the under side of the bracket 260. The cutter-head continues to rise, and the splints are forced into and through the perforations in the plate 253 and then into the holes in the bar of the chain.

88 88 are springs adapted to bear against the top of the wood to prevent its being forced upward when the cutter-head rises. These springs are carried by the rocking bar 89, which is adapted to turn in suitable bearings in the frame of the machine.

90 is a lever (see Fig. 9) connected with one end of the rocking bar, the outer end of which is adapted to be raised or lowered by means of the screw 91 and the nuts 92. By this means the tension of the springs upon the top of the blocks of wood can be properly adjusted.

93 is a stop-bar for limiting the upward motion of the forward ends of the springs to prevent their being permanently bent out of shape. This stop-bar is made adjustable by means of the bolts 94, which are screwed into the frame of the machine and which work in slots 95 in the arms 96, which project upwardly from the ends of the stop-bar. 97 is an inclosed compartment underneath the table of the machine, provided with apertures 98 opposite the cutter-head and connected, by means of the pipe 99, with any suitable form of exhausting device. By this means any splints or waste material that fall between the cutter-head and the table will be drawn out from the machine, thus preventing any danger of clogging.

From the cutting mechanism the splints are carried by the chain to the heating mechanism shown in Figs. 15 to 18.

98ª is a radiator provided with the partitions or baffle-plate 99ª and provided with a suitable inlet-opening and outlet-opening, as shown, for the steam or other heating medium.

100 100 are angle-irons forming suitable ways upon which the chain is adapted to slide.

101 101 are supporting-arms, which are fastened at their upper ends to the ways 100 and which can be raised or lowered and fastened in any desired position by means of the bolts 102, which pass through slots in the supporting-arms and are screwed into the sides of the radiator.

103 represents guide and drive-wheels mounted in suitable bearings at the rear end of the heater. The construction of these wheels is shown in Fig. 18. The wheels are provided with teeth which project between the bars of the chain and drive the chain forward. At the same time the wheels guide the chain and keep it in proper lateral position.

As the chain passes along the ways the splints project downwardly toward the top plate of the radiating device. The distance between the chain and the radiator can be varied to suit different lengths of splints. The splints are dried by the heating mechanism, so as to make them absorbent before entering the paraffin-bath.

The shaft 104, upon which the wheels 103 are mounted, is provided at its end with a miter gear-wheel 105. (See Fig. 1.) The gear 105 meshes with the miter-gear 106, which is attached to the lower end of the vertical shaft 107, which is driven from the horizontal shaft 108 at the top of the machine by means of miter-gears mounted on the two shafts, as shown. The shaft 108 is provided at its forward end with a worm-wheel 109, meshing with the worm 110 on the vertical shaft 111, which is driven from the main driving-shaft by means of the miter-gears 112 and 113.

From the heating mechanism the carrier-chain carries the splints to the mechanism for applying the paraffin or similar substance thereto. The mechanism for applying the paraffin is shown in Figs. 19 to 22, inclusive.

114 is a jacketed pan, adapted to receive and hold the paraffin or similar substance. The jacket is preferably provided with the partitions or baffle-plates 115, by means of which the steam or other heating agent is made to circulate through the jacket and entirely around the pan, so as to heat it thoroughly and uniformly.

116 represents movable ways on opposite sides of the pan upon which the carrier-chain is adapted to slide. These ways are made in the form of angle-irons and are adapted to guide the chain properly as it passes through this part of the machine.

117 represents crank-arms, which are pivoted at their outer ends to the ways 116 and are attached at their other ends to the rock-shafts 118.

119 represents levers connected with the ends of the rock-shafts 118 and carrying the adjustable counterweights 120.

121 represents levers connected with the other ends of the rock-shafts and pivoted at their outer ends to the connecting-rod 122. The rod 122 extends to the front of the machine and is there connected with a hand-lever 123. (See Figs. 1 and 3.)

124 represents guide-wheels adapted to revolve in bearings in the movable ways and to prevent the chain from being lifted up from the ways before a sufficient amount of paraffin has been applied to the splints.

125 is a lip or projection at the rear end of the jacketed pan which is adapted to receive the splints that have fallen out of the chain while the chain is passing through this part of the mechanism. The splints which fall into the paraffin while the chain is passing through the bath are carried to the rear end by the splints themselves or by the chain itself. At this point they can be carried out or drawn out by any suitable device into the lip. The flow of the paraffin also tends to bring the splints to that point. The paraffin is heated in a separate vessel and is pumped continuously by a suitable pump into the pan.

126 is an overflow-outlet for the paraffin, which is preferably placed in the lip 125 and which serves to keep the paraffin in the bath at a desired level. This overflow-pipe is made adjustable, so that the level of the paraffin can be varied according to circumstances.

127 is a discharge-outlet in the bottom of the pan through which the contents of the pan can be allowed to run off when the pan is to be cleaned.

The carrier-chain is supported upon the movable ways 116 and slides upon those ways, the weight of the chain holding it down against the ways. When the machine is started, the rod 122 is drawn forward by means of a hand-lever 123 until the ways 116 have been lowered to the desired level, so as to cause the splints to project into the paraffin the proper distance. The rod 122 is locked in this position, and the ways are thus held at the proper height. The chain passes along the ways until it reaches the guide-wheels 124, after which it rises from the ways and passes over the guide-wheels 128. (See Fig. 1.) If the operator for any reason desires to lift the splints out of the paraffin, he moves the rod 122 backward, thus rocking the rock-shafts 118 and lifting the ways, so that the splints are lifted out of the paraffin. The movement in this direction is assisted by the counterweights 120. In this mechanism the pan is thoroughly and uniformly heated, the paraffin is maintained at a suitable level, and the splints are inserted in the paraffin to a uniform depth and kept there for a uniform period of time. The splints are also easily inserted in or drawn out of the paraffin.

The pan 114 has no coil in the pan itself, but is simply a plain pan or recess which can be easily cleaned by simply heating the paraffin or other material and allowing it to run out through the discharge-outlet 127. After leaving the guide-wheels 128 the chain passes over the guide-wheels 129 (see Fig. 1) and then passes to the mechanism for applying the composition to the splints. This mechanism is clearly shown in Figs. 1, 3, and 23 to 32, inclusive.

Referring to Figs. 23 to 32, 130 is a horizontal vessel or jacket which has a triangular recess open at one end adapted to receive and fit the removable pan 131. The jacket is provided with a heating-coil 132. In the operation of the device the jacket is filled with water, and this water is heated by passing steam or any other suitable heating medium through the coil 132. By this means all danger of overheating the composition is avoided. The jacket is provided with tracks or ways 133, on which the movable pan is adapted to slide.

134 is a composition-roller having a shaft 135 extended at one end for purposes hereinafter described. The shaft of the composition-roller is adapted to revolve in the bearings 136 in the pan. These bearings are provided with caps and screws, as shown, so that they can be opened and the composition-roller removed from the pan, as illustrated in Fig. 27.

137 (see Fig. 28) is a sleeve the outer end of which is adapted to revolve in a bearing in a bracket 138, extending from one end of the jacket 130. The inner end of the sleeve 137 revolves in a bearing or recess 139 in the outer end of the sleeve 140. This sleeve 140 revolves in a suitable bearing in the bracket 138 for purposes to be explained hereinafter. The shaft of the composition-roller is adapted to be inserted in the sleeve 137 or removed therefrom, as desired. When the shaft is inserted in the sleeve, it is keyed thereto by any suitable device, so as to revolve with the sleeve, the sleeve, in effect, forming a part of the shaft. Two pulleys 141 and 142 are mounted upon the sleeve 137 and are so constructed that when they are revolved in a forward direction they are locked to the sleeve;

but when they are revolved in an opposite direction they merely turn or slide upon the sleeve. The special construction by which this result is accomplished is shown in section in Fig. 30. Sleeve 137 is provided with the recesses 143, constructed as shown. The pulleys are provided with pawls 144, which are pressed against the sleeve by the springs 145, held in a suitable recess in the pulleys. It is evident that when the pulleys are revolved in a forward direction the pawls will be forced out into the recesses 143, and the sleeve will thus be locked to the pulley and forced to revolve therewith; but when the pulley is revolved in the opposite direction the pawl merely slides along the inclined surface of the recess 143 and the sleeve is not revolved. The pulley 141 is provided with a sprocket-wheel 146.

147 is a linked belt (see Figs. 31 and 32) connecting the sprocket-wheel 146 with the sprocket-wheel 148 on the shaft 149. This shaft is driven from the horizontal shaft 108 at the upper part of the machine by means of the miter-gears 150 and 151, the vertical shaft 152, the miter-gears 153 and 154, the horizontal shaft 155, and the miter-gears 156 and 157. The sprocket-wheels 146 and 148 are made of such relative diameters that the surface of the composition-roller is given the same speed as the heads of the match-splints, so that the ends of the match-splints will not slip or drag upon the surface of the composition-roller. It will thus be seen that the pulley 141 is driven from the main driving-shaft of the machine and revolves only when the chain is in motion.

The pulley 142 is provided with a sprocket-wheel 158. 159 is a linked belt connecting this sprocket-wheel with the sprocket-wheel 160, which is mounted upon the shaft 161. This shaft 161 is driven continuously by any suitable means (not shown in the drawings) and at such a rate of speed as to give the pulley 142 a slower rate or speed of revolution than the pulley 141.

When the chain is in motion, the pulley 141 is revolved more rapidly than the pulley 142, and thereby revolves the composition-roller at the requisite speed for applying the composition, the pulley 142 meanwhile simply slipping upon the sleeve 137. When the chain is not in motion, the pulley 141 no longer revolves. The pulley 142 then engages the sleeve 137 and causes the composition-roller to continue to revolve, though at a slower rate of speed. It is important in mechanism for applying the composition to make the roller revolve continuously in this manner, so as to prevent the composition from drying on the surface of the roller, which might lead to its ignition, and so as to keep the device always in condition to renew the operation of applying the composition.

162 is a removable mixer or agitator. This agitator is provided with suitable blades or or wings 163. It is mounted at one end in a bearing in the composition-pan and at the other end in a box or bearing 165, which is open at the top, so that the agitator can be lifted out of the pan. 166 is a gear-wheel fastened to the agitator-shaft so as to revolve therewith.

167 is a sleeve adapted to turn on the shaft of the composition-roller and to rock in one of the bearings 136 in the removable pan. The sleeve 167 is provided with a sector 168, which meshes with the gear-wheel 166. The sleeve 167 is adapted to be clutched or locked with the sleeve 140 when the composition-roller is inserted in place in the removable pan and the parts are properly assembled. The form of this clutch is clearly shown in Figs. 28 and 29. The sleeve 167 is provided at its outer end with the projecting teeth 169, which engage with the teeth 170 on the inner end of the sleeve 140. 171 is a crank-arm connected with the sleeve 140 and provided with the crank-pin 172. 173 is a connecting-rod (see Fig. 31) pivoted to the crank-pin 172 and connected at its other end with the eccentric-strap 174, in which the eccentric 175 revolves. By this means the crank-arm 171 is oscillated back and forth, and thereby the agitator is constantly rocked or oscillated. In this way the composition is agitated. At the same time the parts can be easily separated or assembled. The agitator can thus be quickly and readily removed from the composition whenever it is desirable to do so for any purpose.

176 176 are two movable guide-wheels (see Figs. 1, 3, 31, and 32) which are adapted to press the chain down toward the composition-roller, so as to bring the ends of the splints in contact with that roller. These guide-wheels are carried in bearings in the levers 177, which are attached at their other ends to the rock-shaft 178. One end of this rock-shaft is connected, by means of the lever 179, (see Fig. 1,) with the rear end of the connecting-rod 122. When the rod 122 is drawn forward the guide-wheels 176 are forced down, so as to press the chain toward the composition-roller. When the rod 122 is moved in the other direction, the guide-wheels 176 are raised, so as to permit the chain to be lifted away from the composition-roller.

For the purpose of causing the chain to follow these guide-wheels when they are moved upward a hollow drum 180 is provided. (See Fig. 1.) This drum is adapted to revolve in bearing-blocks which slide up and down freely in guides or ways in the struts of the machine. The chain passes underneath this drum, so that the weight of the drum is carried by the chain. The chain after passing under the guide-wheels 129 passes upwardly and over the guide-wheels 181. Then it passes under the drum 180, then upwardly again over the guide-wheels 182. Then it passes underneath the movable guide-wheels 176, then over the guide-wheels 183. The weight of the drum 180 keeps the chain taut at all times against the under surface of the movable guide-wheels 176 and causes the chain to rise away from the composition-roller when the guide-wheels 176 are raised. As a result of this construction the different parts of the mechanism for applying the composition—that is to say, the composition-roller, the pan, the agitator, and the jacket—can be easily separated either for the purpose of cleaning the parts or to prevent the composition from becoming ignited or to extinguish the fire in case the composition should become ignited during the operation of the machine. Means are provided to revolve the roller when the chain is in motion, so as to give the surface of the roller the same speed as the heads of the match-splints carried by the chain, and supplementary means are provided to continue the revolution of the roller at a slower rate of speed when the chain is at rest.

When the rod 122 is forced backward, so as to lift the chain in the paraffin-bath, and thus withdraw the splints from the paraffin, it also operates to lift the guide-wheels 176, and thus to cause the chain to be drawn away from the composition-roller by the weight of the drum 180. When the rod 122 is drawn forward, it not only inserts the splints in the paraffin, but at the same time brings the splints into contact with the composition-roller After the matches have passed away from the composition devices the chain is carried in a horizontal position for a certain length of time, as indicated at 184, Fig. 1, as a result of which the matches hang head downward perpendicularly and the composition on the ends of the splints flows down the splints, tending to drop off. Before the composition drops off, the chain is passed around the lowest one of the vertical row of guide-wheels 185, so that the position of the matches is reversed, and they are made to stand upward in a vertical position. The direction of the flow of the composition on the matches is thus reversed, and the composition runs in the opposite direction down the match-splints. This continues until the position of the chain is again reversed by its passing around the lowest one of the vertical row of guide-wheels 186. This again brings the matches into a vertical position, head downward, and the flow of the composition is again reversed, and so on. Thus there are two rows of guide-wheels arranged vertically at a proper distance from the composition mechanism, whereby the chain after the composition has been applied passes in a substantially horizontal direction from the wheels of the one row to the wheels of the other row alternately and the composition on the splints is caused to flow lengthwise of the splints in one direction and then lengthwise of the splints in the opposite direction, and so on. The guide-wheels 186 are also drive-wheels, being provided with teeth adapted to mesh with the bars of the chain. These guide-wheels are driven by means of gears at the ends of their shafts meshing with gears on the vertical shaft 152, as shown in Fig. 1. 187 is a row of guide-wheels arranged horizontally at the top of the machine, every alternate wheel being also a drive-wheel—that is to say, being provided with teeth adapted to mesh with the bars of the chain, as shown in Fig. 41. These guide and drive wheels 187 are driven by means of gears 188 at the ends of their shafts, which mesh with gears on the horizontal shaft 108. (See Fig. 1.) 189 is a second row of guide-wheels arranged in a substantially horizontal manner, alternating with the guide-wheels 187 of the upper horizontal row.

After the chain leaves the guide-wheels 185 and 186 it passes over the guide-wheels 187 and 189, passing from the first wheel in the row 187 to the first wheel in the row 189, then back to the second wheel in the row 187, and so on alternately. Thus the chain is made to pass in a substantially vertical direction, so as to hold the matches in a substantially horizontal direction. First one side of the match is held downward, then the other side of the match is held downward, and thus the composition on the splints is forced to flow crosswise of the splints in one direction and then crosswise of the splints in the opposite direction. As a result of thus moving the chain first horizontally and then vertically the composition is caused to gradually form itself into a pill-shaped or full-rounded head.

While the chain is passing between the horizontal rows of guide-wheels the heads of the matches are dried by the drying mechanism. (Shown in Figs. 1 and 2.) 190 designates inclosed boxes placed between successive portions of the chain, as shown in Fig. 1, so that the sides of the boxes will be in close proximity to the chain, and the heads of the matches will pass close to the sides of the box. The sides of the box which are adjacent to the chain are perforated, as shown in Fig. 2. The boxes are connected at their lower ends with the closed vessel 191, which is connected, by means of a pipe 192, with any suitable form of air-pump or exhausting device 193.

As the matches pass by the boxes 190 a current of dry air is forced over the heads of the matches, which causes them to dry rapidly. The moist air is removed through the exhausting apparatus.

From the guide-wheels 187 and 189 the chain passes to the discharging mechanism. (Shown in Figs. 33 to 40, inclusive.) This discharging mechanism is preferably placed on the floor above, as represented in Fig. 1, although it may be placed at any other convenient or suitable point.

Referring to Figs. 33 to 40, 194 is a drum which is provided with teeth 195, running longitudinally of the drum, and with grooves 196 between the teeth. The teeth of the drum are adapted to mesh with the bars of the carrier-chain, and the grooves between the teeth are adapted to receive and fit the bars of the chain, so as to hold them in proper position while the matches are being ejected. The drum is provided with the perforations 197, which are between the teeth and which pass through the shell of the drum. These perforations are so spaced that when the bars of the carrier-chain are in the grooves of the drum the perforations in the drum will register with the holes in the bars. Inside of the drum are three guide or spacing rings 198. These rings are provided with grooves or recesses, as clearly shown in Fig. 38, in which the holding-plates 199 reciprocate radially. These holding-plates carry and support the ejecting-pins 200, which project into the perforations 197 of the drum and are adapted to be forced outwardly into the holes in the bars of the carrier-chain, so as to force the matches out of those bars. 201 is a cam-shaft at the center of the drum. This cam-shaft is held in a stationary position during the operation of discharging the matches. 202 represents cams which are mounted upon the cam-shaft 201 and which are adapted to bear against the inner edge of the holding-plates 199, so as to force those plates outwardly at the proper time, and thereby to force the ejecting-pins outwardly and cause the matches to be discharged. These cams are so shaped (see Figs. 38 and 39) that the matches are ejected gradually while the drum is revolving. 203 represents return-cams fixed upon the cam-shaft 201 at the ends of the drum. These return-cams or their overhanging portions are adapted to bear against the outer surface of the ends of the holding-plates 199 at the proper time, so as to force those holding-plates inwardly toward the center of the drum after the matches have been discharged. The shape of the return-cams is clearly shown in Fig. 39. The bearing-surfaces of the holding-plates are provided with slippers 204, as shown in the drawings, to take the wear of the cams. As shown in Fig. 37, the cams 202 are made of suitable width, so that the slippers 204, which are connected with one holding-plate, can be arranged so as to bear upon one half of the cam and the slippers of the adjoining holding-plate can be made to bear upon the other half of the cam. This alternate arrangement of the slippers is designed for the purpose of preventing the slippers from bearing against one another and interfering with one another. The drum is provided at its end with trunnions 205, which are adapted to revolve in suitable bearings in the frame of the machine, as shown. These trunnions turn upon the ends of the cam-shafts. The drum is driven by means of the worm-wheel 206, mounted on the end of the drum-shaft, which meshes with the worm 207 on the shaft 208. 209 is a miter on the shaft 208, which meshes with a miter-gear 210 at the upper end of the vertical shaft 111. (Shown in Fig. 1.) By this means the drum is driven continuously. 211 represents guides on the ends of the drum, adapted to hold the bars of the chain in proper position lengthwise of the drum.

The cam-shaft 201 is provided at one end with a sector or quadrant 212, which meshes with the worm 213, which is carried by the short shaft 214, which revolves in suitable bearings in the frame of the machine. (See Fig. 34.) By turning the shaft 214 the cam-shaft 201 can be turned in either direction, and with it the cams 202 and 203, and thereby the position of the cams can be adjusted so as to regulate the point of discharge of the matches.

215 represents supporting-arms adapted to bear against the outer surface of the bars of the chain where the matches are ejected and to hold the bars against the outer pressure of the ejecting mechanism. These supporting-arms are carried by the bar 216, extending across the machine from side to side and suitably bolted or otherwise fastened to the frame. The lower ends of the supporting-arms 215 are inserted in slots in the bar and secured in position by bolts or in any suitable manner. These supporting-arms project into circumferential grooves 217 in the surface of the drum and are thereby held in proper lateral position. They are so arranged as to bear closely against the bars of the chain on their outer surface, so as to hold the bars firmly in the longitudinal grooves of the drum while the matches are being ejected therefrom. If these supporting-arms were not used, the ejecting-pins would have a tendency to force the bars of the chain out of the grooves of the drum, which would interfere with the operation of the machine. The supporting-arms 215 are so arranged as not to come in contact with the matches.

After the chain leaves the guide-wheels 187 and 189 it passes up to the discharging mechanism and is properly guided thereto by the ways 218 in the frame of the machine. (See Figs. 36 and 38.) The bars of the chain pass into the grooves of the drum successively and fit those grooves accurately. The bars are held in proper position lengthwise of the drum by the guides 211, so that the perforations in the bar exactly register with the perforations in the shell of the drum. The drum revolves continuously, and thereby helps to drive the chain. The cams and cam-shafts being stationary, when the holding-plates reach the ascending portion of the cams 202 the holding-plates begin to move outwardly and force the ejecting-pins into the holes in the bars of the chain and against the inner ends of the matches. As the drum continues to revolve the holding-plates and ejecting-pins are forced out farther and farther, and the matches are gradually pushed out of the holes in the bars until they are at last ejected from the bars at a point opposite the highest point of the cams 202, as clearly illustrated in Fig. 38. The return-cams 203 then force the holding-plates and ejecting-pins backward toward the center of the drum, and so on. The chain then passes over the guide-wheels 219 (see Fig. 38) and is guided away from the discharging mechanism by the ways 220. It then passes over the guide-wheels 221 (see Fig. 1) and then to the cutting mechanism, and so on continuously.

By turning the cam-shaft by the means already described the position of the cams can be altered, so that the matches can be discharged from the chain at a higher or lower point.

In Fig. 37, 222 represents an opening in the cam-shaft, and 223 a pipe connected therewith for the purpose of oiling the bearing-surfaces of the cams.

When the matches are discharged from the chain, they drop into grooves or chutes 224, made in the surface of the plate 225. This plate is screwed or otherwise fastened to the bars 216 (see Fig. 38) and is thus supported in proper position. From the ends of the plate 225 the arms 226 project, (see Fig. 34,) and these arms are joined at their outer ends by the arm 227. Arms 228 extend across from the outer ends of the chutes to the outer arm 227. The arms 228 are placed at suitable intervals, so as to divide the matches and guide them into trays.

229 represents plates hinged at their upper ends to the arms 228, as shown in Fig. 38. The lower ends of the plates 229 are adapted to extend into the match-trays and to guide the matches as they fall into the boxes and cause them to lie parallel with one another in the trays. These plates are hinged at their upper ends to the stationary arms 228, but are movable at their lower ends, so as to drop into or slide out of the match-trays as they pass underneath.

230 is a stop-plate at the opposite end of the hinged plates 229 from the chutes. This stop-plate is slotted vertically, as shown in Fig. 33, so that the portions between the slots will slip down between the arms 228. The stop-plate increases in width toward the end at which the trays pass away from the chutes. The purpose of this plate is to prevent the matches from being thrown out beyond the trays. The stop-plate has a horizontal portion 231, which rests upon the top of the arm 227 and which is movable thereon either toward or away from the hinged plates 229. The position of the stop-plate can thus be adjusted, and when once adjusted the plate is held in position by the screws 232.

233 is a belt adapted to carry or convey the match-trays past the drum. This belt is carried by the pulleys 234 and travels in a groove in the supporting-plate 235. (See Fig. 38.) The belt carries the trays 236.

237 is a shaft upon which one of the pulleys 234 is mounted. This shaft revolves in suitable bearings in the frame of the machine. (See Fig. 40.) 238 is a friction-roller which is keyed to shaft 237, so as to revolve therewith, but is adapted to slide on that shaft. The roller 238 is made of any suitable material or any suitable form and bears against the surface of the gear-wheel 239. The gear-wheel 239 is mounted on a short shaft 240, which revolves in the bearing 241 and is adapted to slide in that bearing. The inner end of the shaft 240 is provided with a shoulder to prevent its being forced out too far.

242 is a coiled spring bearing against the inner end of the shaft 240 and adapted to press the wheel 239 against the friction-roller 238.

243 is a screw turning in a screw-threaded opening in the cap 244, which is bolted or otherwise fastened to the frame of the machine. The inner end of the screw is provided with a suitable head 245, bearing against one end of the coiled spring 242. By turning the screw 243 the tension upon the spring can be regulated.

246 is a screw adapted to turn in bearings in the frame of the machine and provided with a hand-wheel 247 at its outer end. 248 is a nut adapted to travel on the screw 246. The nut 248 is provided with an arm 249, having a forked end entering a groove 250 in the hub of the friction-roller 238. When the screw 246 is turned, the nut 248 is caused to move along the screw and to thereby move the friction-roller on its shaft, so as to make the friction-roller bear on the surface of the gear-wheel 239 nearer the center of that wheel or farther away from the center, according as the friction-roller is moved in one direction or the other. By moving the friction-roller toward the center of the wheel 239 the speed of the roller is reduced, and thereby the speed of the carrying-belt 233 is decreased. By moving the friction-roller away from the center of the wheel 239 the speed of the belt is increased. In this way the speed of the belt can be regulated.

The gear-wheel 239 is driven from the gear 251, which is mounted at one end of the drum-shaft, by means of the intervening gear 252. (See Fig. 35.)

There are two forms of guide-wheels employed in this machine—first, a guide-wheel, such as is shown in Figs. 42 and 44, provided with a surface on which the carrier-chain bears and with a flange to hold the chain in proper lateral position, and, secondly, what is termed in the specification a "guide" and "drive" wheel, such as is shown in Figs. 41 and 43. The guide and drive wheel is provided with teeth, such as are shown in the drawings, which are adapted to mesh with the bars of the chain, and thus to drive the chain, as well as to guide it.

Some of the many advantages which characterize the machine in which we have embodied our invention are as follows: The construction of the bars and links of the carrier-chain and the toothed drum of the cutting mechanism enables the bars to be held accurately and securely in a horizontal position while the match-splints are being inserted in the chain. The discharge of the matches from the chain is continuous and gradual. The angle at which the material is fed to the cutting mechanism can be easily varied and adjusted. The sides of the feed-trough can be made to fit the material accurately, so that it will be properly fed to the cutters. The movement of the abutment-block in both directions is positive, so as to be accurately timed and unfailing in its operation. The chain is substantially taut throughout the machine, no slack portion of any considerable length being required. The different parts of the machine are so constructed and operated as to be properly timed with reference to one another, so that the operation of the machine is continuous. The machine can be easily started or stopped and the chain and splints readily lifted out of the paraffin and the composition. The mechanism for applying the composition is so constructed as to be readily separable, which is a great advantage. The heads of the matches are given a full and perfect form. The matches are discharged from the chain with accuracy and certainty and are automatically delivered into the match-trays in a parallel position and proper number, and the entire machine is so constructed and combined as to be very rapid in its operation and to have a much greater productive capacity than the machines heretofore in use.

What we claim as new, and desire to secure by Letters Patent, is—

1. In combination with splint-cutting mechanism, a feed-table over which the material for the splints is fed to the cutting mechanism, having a stationary part and a movable part, adapted to be moved to change the angle of the line of feed of the splint material with reference to the cutting mechanism, guides for the splint material made adjustable toward and from each other, and means for feeding the splint material between such guides to the cutting mechanism, substantially as and for the purpose described.

2. The combination with suitable splint-cutting mechanism, of a feed-table, consisting of a stationary part and a movable part, adjustable side guides, a feed-roller carried by the movable part, and means for operating the roller in whatever position the movable part of the table may be.

3. In combination with a splint-cutting mechanism, a feed-table for the material for the splints having a stationary part and a movable part, guides between which the material for the splints is fed toward the cutters made adjustable toward and from each other, a feed-roller for the splint material mounted in bearings on the movable part of the table, a worm-wheel connected with the feed-roller, the worm meshing with such wheel having portions of its threads made spiral, and other portions circumferential, bearings for the worm on the movable part of the table, a driving-shaft and a universal-joint connection between such shaft and the worm having a portion made to slide with reference to each other so that the connection can lengthen out and shorten as the movable part of the feed-table is moved in one direction, and the other with reference to the stationary part of the table, substantially as and for the purpose described.

4. In combination with a splint-cutting mechanism, a feed-table over which the material for the splints is fed to the cutting mechanism having a stationary part and a movable part adapted to be swung with reference to the stationary part, to change the angle of the feed of the material to the cutting mechanism, guides between which the material is fed adjustably supported on the feed-table, so as to be adjustable toward and from each other, feed-rollers carried by the movable part of the table, gearing connecting the rollers, intermittent-motion gearing for driving the rollers intermittently, a driving-shaft, and universal and telescoping connections between such shaft and the gearing for driving the feed-rollers, substantially as and for the purpose described.

5. In a match-making machine, in combination with a splint-carrier, a cutter-head, cutters carried by the cutter-head, an abutment-block adapted to reciprocate in a recess in the cutter-head, a cam-shaft adapted to revolve in a recess in the abutment-block, one or more cams on said shaft adapted to force the abutment-block out underneath the cutters, and one or more cams on said shaft adapted to force the abutment-block back into the cutter-head, and means revolving the cam-shaft, substantially as set forth.

6. In a match-making machine, in combination with a cutter-head, provided with splint-cutting cutters, means for reciprocating the head, a movable abutment-block carried with the cutter-head, a rotary cam-shaft also moving with the head, one or more cams on such shaft, connected with the abutment so as to reciprocate the same toward and from a position under the cutters, a rotary driving-shaft, a gear connected with such shaft so as to rotate therewith and be capable of sliding thereon, a gear meshing with such gear and connected with the cam-shaft, and means for keeping the gears in mesh as the cutter-head reciprocates, substantially as and for the purpose described.

7. In a match-making machine, the combination with suitable splint-cutting mechanism and a carrier-chain adapted to carry the splints, of mechanism for applying paraffin or similar substance to the splints consisting of the jacketed pan 114, the movable ways 116, the crank-arms 117, the rock-shafts 118, the counterweights 120, the levers 119, means to operate the levers, and means to keep the paraffin or other substance at the desired level, substantially as set forth.

8. In a match-making machine, the combination with a carrier-chain adapted to carry match-splints, and means for supporting and driving the chain, of a pan for the composition, means to heat the pan, a composition-roller revolving in the pan, and two separate devices for revolving the roller, one operating only when the chain is in motion to give to the roller the requisite speed for applying the composition and the other operating continuously to drive the roller at a slower rate of speed when the chain is at rest.

9. In a match-making machine, the combination with a carrier-chain adapted to carry the match-splints, and means for supporting and driving the chain, of a pan for the composition, means to heat the pan, a composition-roller revolving in the pan, and two pulleys mounted on the roller-shaft, one adapted to revolve only when the chain is in motion and to give to the roller the requisite speed for applying the composition, and the other adapted to revolve continuously at a slower rate of speed, both the pulleys being adapted to be locked to the shaft when they are revolved in a forward direction and to slip upon the shaft when they are revolved in the other direction, and means for revolving the pulleys whereby when both pulleys are revolved the faster pulley will revolve the roller and the slower pulley will merely slip upon the shaft, while at other times the latter pulley will revolve the roller, substantially as set forth.

10. In a match-making machine, the combination with a carrier adapted to carry match-splints, and means for supporting and driving the carrier, of a pan for the composition, means to heat the pan, the composition-roller 134, the pulleys 141 and 142, the pawls 144, the recesses 143, and means for revolving the pulleys at different rates of speed, substantially as and for the purpose described.

11. In a match-making machine, the combination with a carrier adapted to carry the match-splints, and means for supporting and driving the carrier, of a pan for the composition, means to heat the pan, the composition-roller 134, the pulleys 141 and 142, one of such pulleys being caused to turn faster than the other pulley, the pawls 144, the recesses 143, the sprocket-wheel 146, the linked belt 147, the sprocket-wheel 148, the shaft 149, and connections between the shaft 149 and the driving-shaft of the machine, the sprocket-wheel 158, the linked belt 159, the sprocket-wheel 160, the shaft 161, and means for driving the shaft 161.

12. In a match-making machine, the combination with a carrier adapted to carry the match-splints, and means for supporting and driving the carrier, of a jacket, means to heat the jacket, a sleeve revolving in bearings in the jacket, two pulleys mounted on the sleeve, one revolving only when the carrier is in motion and giving to the sleeve and through it to the composition-roller the requisite speed for applying the composition, and the other revolving continuously at a slower rate of speed, means for locking the pulleys to the sleeve when they are revolved in a forward direction, and allowing them to rotate thereon when they are revolved in the other direction, and means for revolving the pulleys, a removable pan for the composition adapted to fit the jacket, a composition-roller adapted to revolve in bearings in the pan and removable therefrom, and provided with an extension of its shaft adapted to be inserted in the revolving sleeve of the jacket and to be keyed thereto.

13. In a match-making machine, the combination with a carrier-chain adapted to carry the match-splints, and means for supporting and driving the chain, of a hollow jacket 130, provided with the ways 133, means to heat the jacket, the removable pan 131, provided with bearings for the shaft of the composition-roller, the composition-roller 134, the shaft 135 extended at one end, the sleeve 137 adapted to revolve in bearings in the jacket, the pulleys 141 and 142, the pawls 144, the recesses 143, and means for revolving one pulley when the chain is in motion, so as to give the composition-roller the requisite speed, and means for revolving the other pulley continuously at a slower rate of speed, substantially as set forth.

14. In a match-making machine, in combination with a carrier to carry the match-splints, and means for supporting and moving the carrier, a heating-jacket, having a space within the same made open at one end, means for heating the jacket, a laterally-removable vat for the composition to form match-heads adapted to be slid into the space within the jacket, a composition-roller revolving in suitable removable bearings on the vat, means for rotating the roller, suitable guides to guide the carrier over the roller so that the ends of the splints carried by the carrier will be brought into contact with composition on the roller, and means for moving such guides toward and from the roller, substantially as and for the purpose described.

15. In a match-making machine, the combination with a carrier-chain adapted to carry the match-splints, and means for supporting and driving the chain, of a jacket open at one end and provided with substantially horizontal ways, means to heat the jacket, a removable pan for the composition adapted to be inserted in the open end of the jacket and to slide on the ways, a composition-roller adapted to revolve in bearings in the pan and removable therefrom, means to revolve the roller, movable guide-wheels to press the chain toward the composition-roller, levers carrying the guide-wheels, a rock-shaft to which the levers are attached, and means to rock the rock-shaft, substantially as set forth.

16. In a match-making machine, the combination with a carrier-chain for carrying the match-splints, and means for supporting and driving the chain, of a pan for the composition, means to heat the pan, a composition-roller located in and adapted to revolve in the pan, two separate devices for revolving the roller, one to operate only when the chain is in motion and to give to the roller the requisite speed for applying the composition, and the other to operate continuously and to drive the roller at a slower rate of speed when the chain is at rest, movable guide-wheels to press the chain toward the composition-roller when the chain is in motion, and means to move the guide-wheels, substantially as set forth.

17. In a match-making machine, the combination with a carrier-chain for carrying the match-splints, and means for supporting and driving the chain, of a jacket, means to heat the jacket, a sleeve revolving in bearings in the jacket, two pulleys mounted on the sleeve, one to revolve only when the chain is in motion and to give to the sleeve and through it to the composition-roller, the requisite speed for applying the composition, and the other to revolve continuously at a slower rate of speed, means for locking both the pulleys to the sleeve when they are revolving in a forward direction and for permitting them to slip upon the sleeve when they are revolved in the other direction, means for revolving the pulleys, a removable pan for the composition adapted to fit the jacket, a composition-roller mounted to revolve in bearings in the pan and removable therefrom, and provided with an extension of its shaft adapted to be inserted in the revolving sleeve of the jacket and to be keyed thereto, movable guide-wheels to press the chain toward the composition-roller, levers carrying the guide-wheels, a rock-shaft to which the levers are attached, and means to rock the shaft.

18. In a match-making machine, the combination with a carrier-chain adapted to carry the match-splints, and means for supporting and driving the chain, of a jacket, means to heat the jacket, a removable pan for the composition adapted to fit the jacket, a composition-roller adapted to revolve in bearings in the pan, means to revolve the roller, an agitator adapted to oscillate in bearings in the pan, a gear-wheel on the agitator, a sleeve on the shaft of the roller, a sector connected with the sleeve and meshing with the gear-wheel, and means to rock the sleeve.

19. In a match-making machine, the combination with a carrier-chain adapted to carry the match-splints, and means for supporting and driving the chain, of a jacket, means to heat the jacket, a removable pan for the composition adapted to fit the jacket, a composition-roller adapted to revolve in bearings in the pan and removable therefrom, means to revolve the roller, an agitator adapted to oscillate in bearings in the pan and removable therefrom, a gear-wheel on the agitator, a sleeve on the shaft of the roller, a sector connected with the sleeve and meshing with the wheel, and means to rock the sleeve.

20. In a match-making machine, the combination with a carrier-chain adapted to carry the match-splints, and means for supporting and driving the chain, of a pan for the composition, the removable roller 134, means to revolve the roller, the removable agitator 162, the sleeve 167 adapted to rock on the roller-shaft, the sector 168, the gear 166 on the agitator-shaft, and means to rock the sleeve.

21. In a match-making machine, the combination with a carrier-chain adapted to carry the match-splints, and means for supporting and driving the chain, of a hollow jacket 130, provided with the ways 133, means to heat the jacket, the removable pan 131, provided with bearings 136, the composition-roller 134 adapted to be inserted in or removed from the bearings 136, means to revolve the roller, the removable agitator 162, the sleeve 167 adapted to rock on the roller-shaft, the sector 168, the gear 166 on the agitator-shaft, and means to rock the sleeve.

22. In a match-making machine, the combination with a carrier-chain adapted to carry the match-splints, and means for supporting and driving the chain, of a pan for the composition, means to heat the pan, a removable composition-roller mounted to revolve in the pan, two pulleys mounted on the roller-shaft, one to revolve only when the chain is in motion and to give to the roller the requisite speed for applying the composition, and the other to revolve continuously at a slower rate of speed, means for locking both the pulleys being adapted to be locked to the shaft when they are revolved in a forward direction and for permitting them to slip upon the shaft when they are revolved in the other direction, means for revolving the pulleys, a removable agitator adapted to oscillate in bearings in the pan, a sleeve adapted to rock on the shaft of the roller, a sector connected with the sleeve, a gear-wheel on the agitator-shaft meshing with the sector, and means to rock the sleeve.

23. In a match-making machine, the combination with a carrier-chain adapted to carry the match-splints, and means for supporting and driving the chain, of a hollow jacket 130, provided with the ways 133, means to heat the jacket, the removable pan 131, provided with bearings for the shaft of the composition-roller, the removable composition-roller 134, the shaft 135 extended at one end, the sleeve 137 adapted to revolve in bearings in the jacket, the pulleys 141 and 142, the pawls 144, the recesses 143, means for revolving one pulley when the chain is in motion so as to give the composition-roller the requisite speed, means for revolving the other pulley continuously at a slower speed, the removable agitator 162, the sleeve 167 adapted to rock on the roller-shaft, the sector 168, the gear 166 on the agitator-shaft, and means to rock the sleeve.

24. In a match-making machine, the combination with a carrier-chain adapted to carry the match-splints, and means for supporting and driving the chain, of a hollow jacket 130, provided with the ways 133, means to heat the jacket, the removable pan 131 provided with bearings for the shaft of the composition-roller, the removable composition-roller 134, the shaft 135 extended at one end, the sleeve 137 adapted to revolve in bearings in the jacket, the pulleys 141 and 142, the pawls 144, the recesses 143, means for revolving one pulley when the chain is in motion so as to give the composition-roller the requisite speed, means for revolving the other pulley continuously at a slower speed, the removable agitator 162, the sleeve 167 adapted to rock on the roller-shaft, the sector 168, the gear 166 on the agitator-shaft, the sleeve 140 adapted to turn in a bearing in the jacket and to be locked to the sleeve 167, the crank-arm 171, and means to rock the crank-arm.

25. In a match-making machine, the combination with a carrier-chain adapted to carry the match-splints, and means for supporting and driving the chain, of a hollow jacket 130, provided with the ways 133, means to heat the jacket, the removable pan 131, provided with bearings for the shaft of the composition-roller, the removable composition-roller 134, the shaft 135 extended at one end, the sleeve 137 adapted to revolve in bearings in the jacket, the pulleys 141 and 142, the pawls 144, the recesses 143, means for revolving one pulley when the chain is in motion so as to give the composition-roller the requisite speed, means for revolving the other pulley continuously at a slower speed, the removable agitator 162, the sleeve 167 adapted to rock on the roller-shaft, the sector 168, the gear 166 on the agitator-shaft, and means to rock the sleeve, and movable guide-wheels to press the chain toward the composition-roller and means to move the guide-wheels, substantially as set forth.

26. In a match-making machine, the combination with a carrier-chain adapted to carry match-splints, and means for supporting and driving the chain, of a jacket open at one end and provided with ways, means to heat the jacket, a removable pan for the composition adapted to be inserted in the open end of the jacket and to slide on the ways, a composition-roller adapted to revolve in bearings in the pan and removable therefrom, means to revolve the roller, and movable guide-wheels to press the chain toward the composition-roller, and means to move the guide-wheels, a drum adapted to bear down upon the chain and to keep it taut against the guide-wheels, bearing-blocks in which the drum revolves, and guides in the frame of the machine in which the bearing-blocks slide, substantially as set forth.

27. In a match-making machine, the combination with a carrier-chain adapted to carry the matches, and means for supporting and driving the chain, of a revolving toothed drum adapted to receive and carry the chain, and means within the drum movable with reference to the latter and adapted to eject the matches from the chain.

28. In a match-making machine, in combination with a movable carrier adapted to hold match-splints and carry them to and by treating devices to make such splints into matches, means for supporting and driving the carrier, and a revolving drum past which the carrier is moved, provided with means movable relative thereto for engaging the ends of the match-splints and ejecting them from the carrier, substantially as and for the purpose described.

29. In a match-making machine, the combination with a carrier-chain adapted to carry the matches, and means for supporting and driving the chain, of a revolving toothed drum adapted to receive and carry the chain and means within the drum movable with reference to the latter and adapted to gradually eject the matches from the chain while the drum continues to revolve.

30. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, and means within the drum movable with reference to the latter and adapted to eject the matches from the chain.

31. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, and means to reciprocate the pins so as to eject the matches.

32. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, and means to reciprocate the pins as the drum revolves so as to eject the matches gradually during the revolution of the drum.

33. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, means to reciprocate the pins so as to eject the matches, and guides on the drum to hold the bars in proper position lengthwise of the drum.

34. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, and means to reciprocate the holding-plates.

35. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, means to reciprocate the holding-plates, and guides on the drum to hold the bars in proper position lengthwise of the drum.

36. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, means to reciprocate the holding-plates, and guide-rings in the drum to guide the holding-plates.

37. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, guide-rings in the drum to guide the holding-plates, and stationary cams within the drum adapted to reciprocate the holding-plates while the drum revolves and to gradually eject the matches from the chain, substantially as set forth.

38. In a match-making machine, the combination with a carrier-chain consisting of bars and links, the bars having holes to receive the matches, and means for supporting and driving the chain, a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, guide-rings in the drum to guide the holding-plates, stationary cams within the drum adapted to reciprocate the holding-plates while the drum revolves and to gradually eject the matches from the chain, and means to adjust the position of the cams so as to regulate the point of discharge of the matches.

39. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, the ejecting-pins 200, the holding-plates 199, the guide-rings 198, the cam-shaft 201, the cams 202, 203, and means to turn the cam-shaft so as to regulate the position of the cams.

40. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, the ejecting-pins 200, the holding-plates 199, the guide-rings 198, the cam-shaft 201, the cams 202, 203, the sector 212, and the worm 213.

41. In a match-making machine, the combination of a carrier-chain consisting of the bars 79 and the links 83, the revolving drum 194, provided with the teeth 195, the grooves 196, the perforations 197, and the guides 211, the ejecting-pins 200, the holding-plates 199, the guide-rings 198, the cam-shaft 201, the cams 202, 203, and means to turn the cam-shaft so as to regulate the position of the cams.

42. In a match-making machine, the combination of a carrier-chain consisting of the bars 79 and the links 83, the revolving drum 194 provided with the teeth 195, the grooves 196, the perforations 197, and the guides 211, the ejecting-pins 200, the holding-plates 199, the guide-rings 198, the cam-shaft 201, the cams 202, 203, and means to turn the cam-shaft so as to regulate the position of the cams, the worm-wheel 206 on the drum, the worm 207 meshing therewith, and means for driving the worm, substantially as set forth.

43. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, and means within the drum adapted to eject the matches from the chain, and supporting-arms to bear against the outer surface of the bars of the chain where the matches are ejected and to hold the bars against the outward pressure of the ejecting mechanism.

44. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, means to reciprocate the pins as the drum revolves so as to eject the matches gradually during the revolution of the drum, and supporting-arms to bear against the outer surface of the bars of the chains where the matches are ejected and to hold the bars against the outward pressure of the ejecting-pins.

45. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, guide-rings in the drum to guide the holding-plates, stationary cams within the drum adapted to reciprocate the holding-plates while the drum revolves and to gradually eject the matches from the chain, and supporting-arms to bear against the outer surface of the bars of the chain where the matches are ejected and to hold the bars against the outward pressure of the ejecting-pins.

46. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, means to reciprocate the pins so as to eject the matches, means to convey the match-trays past the drum, chutes leading from the place where the matches are ejected from the chain to the tray-conveyer, and plates hinged to a stationary part of the machine at the outer end of the chutes to guide the matches.

47. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, and ejecting-pins within the drum adapted to project through the perforations in the drum and into the holes in the bars, means to reciprocate the pins so as to eject the matches, means to convey the match-trays past the drum, chutes leading from the place where the matches are ejected from the chain to a conveyer, plates hinged to a stationary part of the machine at the outer end of the chutes to guide the matches, and a stop-plate at the opposite end of the hinged plates from the chutes.

48. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, means to reciprocate the pins so as to eject the matches, means to convey the match-trays past the drum, chutes leading from the place where the matches are ejected from the chain to a tray-conveyer, plates hinged to a stationary part of the machine at the outer end of the chutes to guide the matches, and an adjustable stop-plate at the opposite end of the hinged plates from the chutes, substantially as set forth.

49. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, holding-plates carrying the pins, guide-rings in the drum to guide the holding-plates, stationary cams within the drum adapted to reciprocate the holding-plates while the drum revolves and to gradually eject the matches from the chain, means to convey match-trays past the drum, chutes leading from the place where the matches are ejected from the chain to the tray-conveyer and plates hinged to a stationary part of the machine at the outer end of the chutes to guide the matches, substantially as set forth.

50. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, means to reciprocate the pins so as to eject the matches, the belt 233 to carry the match-trays past the drum, the chutes 224, the arms 228, the plates 229 hinged to the arms 228, and the stop-plate 230, substantially as set forth.

51. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, ejecting-pins within the drum adapted to project through the perforations in the drum and into the holes in the bars, means to reciprocate the pins so as to eject the matches, supporting-arms to bear against the outer surface of the bars of the chain where the splints are ejected and to hold the bars against the outward pressure of the ejecting mechanism, means to convey the match-trays past the drum, chutes leading from the place where the matches are ejected from the chain to the tray-conveyer, and plates hinged to a stationary part of the machine at the outer end of the chutes to guide the matches, substantially as set forth.

52. In a match-making machine, the combination with a carrier-chain consisting of bars and links, the bars having holes to receive the matches, and means for supporting and driving the chain, of a revolving toothed drum, the grooves between the teeth of the drum being adapted to receive and fit the bars of the chain, the drum being perforated between the teeth so that the perforations in the drum will register with the holes in the bars, the ejecting-pins within the drum adapted to project through the perforations in the drum and into the holes in the bars, holding-plates carrying the pins, guide-rings in the drum to guide the holding-plates, stationary cams within the drum adapted to reciprocate the holding-plates while the drum revolves and to gradually eject the matches from the chain, means to convey the match-trays past the drum, chutes leading from the place where the matches are ejected from the chain to the tray-conveyer, plates hinged to a stationary part of the machine at the outer end of the chutes to guide the matches, the belt 233 to carry the match-trays past the drum, the chutes 224, the arms 228 and the plates 229 hinged to the arms 228, and the stop-plate 230, substantially as set forth.

53. In a match-making machine, in combination with a carrier, and means for supporting and moving the same, a cutter-head, cutters carried by the cutter-head, means for moving such head to and from the carrier, means for feeding the splint material to the cutters, a perforated guide-plate between the carrier and the cutters, frictional connections between the cutter-head and such guide-plate to move the plate with the head, and means for limiting the motion of the guide-plate, whereby the motion of the guide-plate with the cutter-head is limited, without stopping the cutter-head, substantially as and for the purpose described.

54. In a match-making machine, the combination with a carrier-chain, and means for supporting and driving the chain, of a cutter-head, cutters carried by the cutter-head, means for feeding the material to the cutters, means for holding the chain in position while the splints are being inserted therein, the perforated guide-plate 253, the rods 257, fastened to the cutter-head, the splint-tubes 255 adapted to encircle the rods 257 and to be in frictional contact therewith, the collars 261 and 262 on the tubes, and the brackets 260 having bearings in which the tubes slide and against which the collars 261 and 262 are adapted to strike, substantially as set forth.

55. In a match-making machine, the combination of a feed-table, adjustable side guides, a feed-roller, means for operating the roller, a carrier-chain consisting of bars, each provided with a single row of holes to receive the match-splints and links for connecting the bars, means for supporting and driving the chain, a cutter-head, cutters carried by the cutter-head, an abutment-block adapted to reciprocate in a recess of the cutter-head, a cam adapted to force the abutment-block back into the cutter-head, means for operating said cams, a toothed drum to hold the bars in place while the splints are being inserted therein, the grooves between the teeth of the drum being of such size as to receive and fit the bars of the chain, means to operate the drum, a heating mechanism consisting of a radiating device and ways supported at a suitable distance from the radiating device on which the chain is adapted to slide, mechanism for applying the paraffin or similar substance to the splints, consisting of a pan to hold the substance, means for heating the pan, movable ways on which the chain is adapted to be carried, and means to raise and lower the ways, mechanism for applying the composition to the splints consisting of a jacket, means to heat the jacket, a removable pan for the composition adapted to fit the jacket, a composition-roller adapted to revolve in bearings in the pan and removable therefrom, and means to revolve the roller, movable guide-wheels to press the chain toward the composition-roller and means to move the guide-wheels, a removable agitator adapted to oscillate in bearings in the pan and means to oscillate the agitator, means to form the heads of matches, mechanism for discharging the matches from the chain consisting of a revolving toothed drum adapted to receive and fit the chain, the grooves between the teeth of the drum being adapted to receive and fit the bars of the chain, the drum being perforated between the teeth so that the perforations in the drum will register with the holes in the bars, and ejecting-pins within the drum adapted to project through the perforations in the drum and into the holes in the bars, and means to reciprocate the pins so as to eject the matches, means to convey the match-trays past the drum, chutes leading from the place where the matches are ejected from the chain to the tray-conveyer, and plates hinged to a stationary part of the machine at the outer end of the chutes to guide the matches, substantially as set forth.

56. In a match-making machine, the combination of a feed-table, adjustable side guides, a feed-roller, yielding bearings in which the roller is mounted, means for operating the roller, a carrier-chain consisting of bars each provided with a single row of holes to receive the match-splints, and links for connecting the bars, each link being pivoted to one of the bars that it connects so as to turn thereon but being fastened to the adjoining bar so as not to turn thereon, a cutter-head, cutters carried by the cutter-head, an abutment-block adapted to reciprocate in the recess in the cutter-head, a cam-shaft adapted to revolve in the recess in the abutment-block, one or more cams on said shaft adapted to force the abutment-block out underneath the cutters, and one or more cams on said shaft adapted to force the abutment-block back into the cutter-head, means for revolving the cam-shaft, a toothed drum to hold the bars of the carrier-chain in place while the splints are being inserted therein, the grooves between the teeth of the drum being of such a size as to receive and fit the bars of the chain, and the bottom of each groove being formed in such a plane as to make the bottom of the grooves horizontal when in operative position, and mechanism adapted to give an intermittent motion to the drum and to stop the drum when the middle of a link is immediately below the center of the drum, and heating mechanism consisting of a radiating device and adjustable ways on which the chain is adapted to slide, and means for adjusting the ways, mechanism for applying paraffin or similar substance to the splints, consisting of a pan to hold the substance, means for heating the pan, movable ways on which the chain is adapted to be carried, crank-arms connected at one end to the ways and a rock-shaft to which the other ends of the crank-arms are secured and means to rock the rock-shaft, mechanism for applying the composition to the splints consisting of a jacket, means to heat the jacket, a removable pan for the composition adapted to fit the jacket, a composition-roller adapted to revolve in bearings in the pan when the chain is in motion so as to give the surface of the roller the same speed as the heads of the match-splints carried by the chain, and supplementary means to continue the revolution of the roller when the chain is at rest, an agitator adapted to oscillate in bearings in the pan, a gear-wheel on the agitator, a sleeve on the shaft of the roller, a sector connected with the sleeve and meshing with the gear-wheel and means to rock the sleeve, movable guide-wheels to press the chain toward the composition-roller and means to move the guide-wheels, mechanism for forming the heads of matches consisting of two rows of guide-wheels arranged vertically at a proper distance from the composition mechanism and two rows of guide-wheels arranged horizontally, mechanism for discharging the matches from the carrier-chain consisting of a revolving toothed drum, the grooves between the teeth of the drum being adapted to receive and fit the bars of the chain, the drum being perforated between the teeth so that the perforations in the drum will register with the holes in the bars, means to reciprocate the pins so as to eject the matches, guides on the drum to hold the bars in proper position lengthwise of the drum, supporting-arms to bear against the outer surface of the bars of the chain where the matches are ejected and to hold the bars against the outward pressure of the ejecting mechanism, means to convey the matches past the drum, chutes leading from the place where the matches are ejected from the chain to a tray-conveyer, plates hinged to a stationary part of the machine at the outer end of the chutes to guide the matches, and a stop-plate at the opposite end of the hinged plates from the chutes and means for regulating the speed of the tray-conveyer, substantially as set forth.

57. In a match-making machine, the combination of a feed-table, adjustable side guides, a feed-roller upon the table, a second feed-roller below the table and adapted to bear on the under side of the material, the two rollers being geared together so as to have the same surface speed, a worm-wheel connected with the shaft of one of the feed-rollers, an intermittent worm meshing with the worm-wheel and means for driving the worm, a carrier-chain consisting of bars each provided with a single row of holes to receive the match-splints, and links for connecting the bars, a cutter-head, cutters carried by the cutter-head, an abutment-block adapted to reciprocate in a recess in the cutter-head, a cam-shaft adapted to revolve in a recess in the abutment-block, one or more cams on said shaft adapted to force the abutment-block out underneath the cutters, one or more cams on said shaft adapted to force the abutment-block back into the cutter-head and means for revolving the cam-shaft, a toothed drum to hold the bars in place while the splints are being inserted therein, the grooves between the teeth of the drum being of such a size as to receive and fit the bars of the chain, a worm-wheel connected with the shaft of the drum, an intermittent worm engaging with the worm-wheel and means to operate the intermittent worm, and heating mechanism consisting of a radiating device and adjustable ways on which the chain is adapted to slide, and means for adjusting the ways, mechanism for applying paraffin or similar substance to the splints consisting of a pan to hold the substance, movable ways on which the chain is adapted to be carried, means to raise or lower the ways, and a lip at the rear end of the pan to receive the splints that have fallen out of the chain, mechanism for applying the composition to the splints consisting of a jacket, means to heat the jacket, a removable pan, a composition roller adapted to revolve in bearings in the pan and removable therefrom, two pulleys mounted on the roller-shaft, one adapted to revolve only when the chain is in motion and to give the roller the requisite speed for applying the composition, and the other adapted to revolve continuously at a slower rate of speed, both pulleys being adapted to be locked to the shaft when they are revolved in a forward direction and to slip upon the shaft when they are revolved in the other direction, and means for revolving the pulleys, an agitator adapted to oscillate in bearings in the pan, a gear-wheel on the agitator, a sleeve on the shaft of the roller, a sector connected with the sleeve, movable guide-wheels adapted to press the chain toward the composition-roller, means to move the guide-wheels, a revolving drum adapted to bear down upon the chain and move up and down in guides in the frame of the machine as the chain rises and falls so as to keep the chain taut against the guide-wheels, mechanism for forming the heads of the matches consisting of two rows of guide-wheels arranged vertically and at a proper distance from the composition mechanism and two rows of guide-wheels arranged horizontally, mechanism for drying the matches consisting of an inclosed perforated box placed in proximity to the chain, so that the heads of the matches pass close to the box, and an air-pump connected to the box, mechanism for discharging matches from the chain consisting of the revolving drum 194, provided with the teeth 195, and the grooves 196 and the perforations 197 and the guides 211, the ejecting-pins 200, the holding-plates 199, the guide-rings 198, the cam-shaft 201, the cams 202, 203, and means to turn the cam-shaft so as to regulate the position of the cams, the worm-wheel 206 on the drum, the worm 207 meshing therewith and means for driving the worm, supporting-arms to bear against the outer surface of the bars of the chain where the matches are ejected and to hold the bars against the outward pressure of the ejecting mechanism, a belt to convey the match-trays past the drum, chutes leading from the place where the matches are ejected from the chain to the belt, plates hinged to a stationary part of the machine at the outer end of the chutes to guide the matches and an adjustable stop-plate at the opposite end of the hinged plates from the chutes, substantially as set forth.

58. In a match-machine, the combination of a match-carrier, a rotary device situated near the path of said carrier, match-expelling projections carried by said rotary device, and means for moving said projections relative to said rotary device and toward the match-carrier to expel the matches from the latter.

59. In a match-machine, the combination of a match-carrier, a rotary drum mounted near the path of said carrier, expelling projections mounted in said drum and radially movable therein, and means for moving the projections outwardly in the drum to expel the matches from the match-carrier.

60. In a match-machine, the combination of a match-carrier, a rotary device situated near the path of said carrier, match-expelling projections carried by said rotary device, and means for moving said projections relative to the periphery of the said rotary device and toward the match-carrier to expel the matches from the latter.

In testimony whereof we have signed our names to this specification in the presence of two subscribing witnesses.

CHARLES D. SHRADY.
WILLIAM D. STIVERS.

Witnesses:
EDWIN SEGER,
GEO. W. MILLS, Jr.